(12) United States Patent  
Huang

(10) Patent No.: US 8,477,431 B2  
(45) Date of Patent: Jul. 2, 2013

(54) IMAGE CAPTURING LENS ASSEMBLY

(75) Inventor: Hsin-Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 116 days.

(21) Appl. No.: 13/293,127

(22) Filed: Nov. 10, 2011

(65) Prior Publication Data

US 2012/0314304 A1     Dec. 13, 2012

(30) Foreign Application Priority Data

Jun. 10, 2011    (TW) .............................. 100120399 A

(51) Int. Cl.
    *G02B 13/18*      (2006.01)
    *G02B 9/62*      (2006.01)

(52) U.S. Cl.
    USPC .......................................... 359/713; 359/759

(58) Field of Classification Search
    USPC ................................................ 359/713, 759
    See application file for complete search history.

(56) References Cited

U.S. PATENT DOCUMENTS

| | | | |
|---|---|---|---|
| 7,365,920 B2 | 4/2008 | Noda | |
| 8,310,767 B2 * | 11/2012 | Huang et al. | 359/713 |
| 8,379,323 B2 * | 2/2013 | Huang et al. | 359/713 |
| 8,385,006 B2 * | 2/2013 | Tsai et al. | 359/713 |
| 8,390,940 B2 * | 3/2013 | Tsai et al. | 359/713 |

* cited by examiner

*Primary Examiner* — David N Spector
(74) *Attorney, Agent, or Firm* — CKC & Partners Co., Ltd.

(57) ABSTRACT

An image capturing lens assembly includes, in order from an object side to an image side, a first lens element with positive refractive power having a convex object-side surface, a second lens element with positive refractive power, a third lens element with refractive power, a fourth lens element with refractive power, a fifth lens element with refractive power having a convex image-side surface, and a sixth lens element with refractive power having a concave image-side surface. An object-side surface and the image-side surface of the sixth lens element are aspheric, and the sixth lens element has at least one inflection point formed on the image-side surface thereof.

24 Claims, 17 Drawing Sheets

IMAGE CAPTURING LENS ASSEMBLY

RELATED APPLICATIONS

The application claims priority to Taiwan Application Serial Number 100120399, filed Jun. 10, 2011, which is herein incorporated by reference.

BACKGROUND

1. Technical Field

The present invention relates to an image capturing lens assembly. More particularly, the present invention relates to a compact image capturing lens assembly applicable to electronic products.

2. Description of Related Art

In recent years, with the popularity of mobile products with camera is functionalities, the demand for compact optical image capturing lens assemblies is increasing. The sensor of a conventional optical image capturing camera is typically a CCD (Charge-Coupled Device) image sensor or a CMOS (Complementary Metal-Oxide-Semiconductor) sensor. As advanced semiconductor manufacturing technologies have allowed the pixel size to be reduced and compact optical image capturing lens assemblies have gradually evolved toward the fields of higher megapixels, there is an increasing demand for compact optical image capturing lens assemblies featuring better image quality.

A conventional compact optical image capturing lens assembly employed in a portable electronic product typically utilizes a four-element lens structure. Due to the popularity of mobile products with high specifications, such as smart phones and PDAs (Personal Digital Assistants), the pixel and image-quality requirements of the compact optical image capturing lens assembly have increased rapidly. However, the conventional four-piece lens structure cannot satisfy such requirements of the compact optical image capturing lens assembly. Furthermore, the trend in modern electronics is developed toward increasingly higher performance and compact size. Therefore, a need exists in the art for providing an optical image capturing lens assembly for use in a mobile electronic product that has excellent imaging quality without too long total track length.

SUMMARY

According to one aspect of the present disclosure, an image capturing lens assembly includes, in order from an object side to an image side, a first lens element, a second lens element, a third lens element, a fourth lens element, a fifth lens element and a sixth lens element. The first lens element has positive refractive power and a convex object-side surface. The second lens element has positive refractive power. The third lens element has refractive power. The fourth lens element has refractive power. The fifth lens element has refractive power and a convex image-side surface. The sixth lens element has refractive power and a concave image-side surface, wherein an object-side surface and the image-side surface of the sixth lens element are aspheric, and the sixth lens element has at least one inflection point formed on the image-side surface thereof. When a focal length of the image capturing lens assembly is f, and a focal length of the third lens element is f3, the following relationship is satisfied:

$$|f/f3|>0.5.$$

According to another aspect of the present disclosure, an image capturing lens assembly includes, in order from an object side to an image side, a first lens element, a second lens element, a third lens element, a fourth lens element, a fifth lens element and a sixth lens element. The first lens element has positive refractive power and a convex object-side surface. The second lens element has positive refractive power. The third lens element has refractive power. The fourth lens element has refractive power. The fifth lens element has refractive power with a convex image-side surface and is made of plastic material. The sixth lens element has refractive power with a concave image-side surface and is made of plastic material, wherein the object-side surface and the image-side surface of the sixth lens element are aspheric, and the sixth lens element has at least one inflection point formed on the image-side surface thereof. When a focal length of the image capturing lens assembly is f, a focal length of the first lens element is f1, a focal length of the second lens element is f2, and the Abbe number of the second lens element is V2, the following relationships are satisfied:

$$0.3<(f/f1)+(f/f2)<3.5;\text{ and}$$

$$V2>28.$$

According to yet another aspect of the present disclosure, an image capturing lens assembly includes, in order from an object side to an image side, a first lens element, a second lens element, a third lens element, a fourth lens element, a fifth lens element and a sixth lens element. The first lens element has positive refractive power and a convex object-side surface. The second lens element has positive refractive power. The third lens element has refractive power. The fourth lens element has refractive power. The fifth lens element has positive refractive power and is made of plastic material. The sixth lens element has negative refractive power with a concave image-side surface and is made of plastic material, wherein an object-side surface and the image-side surface of the sixth lens element are aspheric, and the sixth lens element has at least one inflection point formed on the image-side surface thereof.

DETAILED DESCRIPTION

Figure 1:
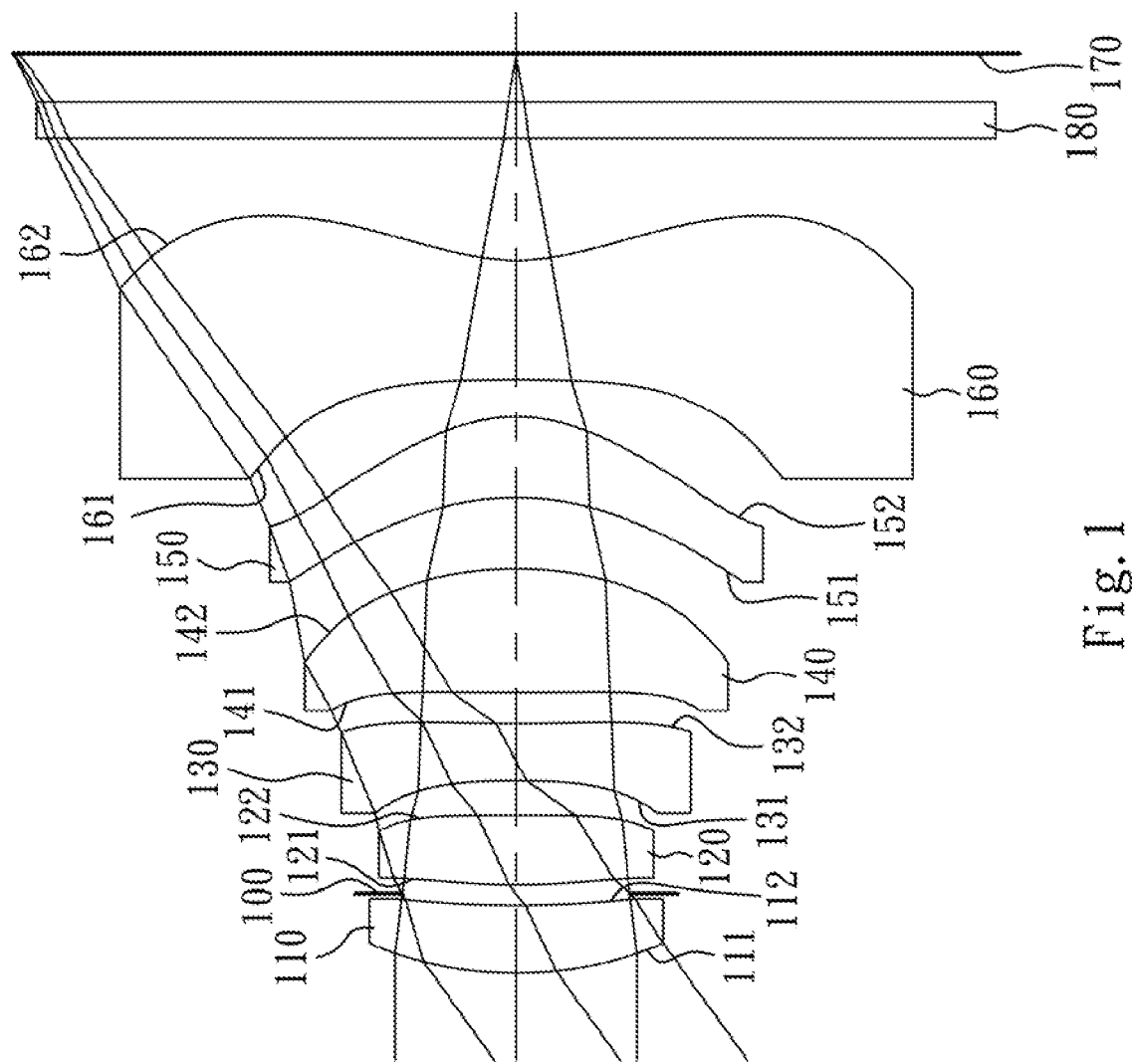
FIG. 1 is a schematic view of an image capturing lens assembly according to the first embodiment of the present disclosure.

An image capturing lens assembly includes, in order from an object side to an image side, a first lens element, a second lens element, a third lens element, a fourth lens element, a fifth lens element and a sixth lens element. The image capturing lens assembly further includes an image sensor located on an image plane.

The first lens element with positive refractive power provides partial refractive power for reducing the total track length of the image capturing lens assembly. The first lens element can have a convex object-side surface and a convex image-side surface, or a convex object-side surface and a concave image-side surface such as a meniscus. When the first lens element has a convex object-side surface and a convex image-side surface, the refractive power of the first lens element can be enhanced for reducing the total track length of the image capturing lens assembly. When the first lens element is a meniscus, the astigmatism of the image capturing lens assembly can be corrected.

The second lens element with positive refractive power provides partial positive refractive power for reducing the total track length of the image capturing lens assembly and can reduce the sensitivity in manufacturing tolerance of the image capturing lens, assembly by providing partial distribution of the refractive power of the first lens element. When the second lens element has a convex object-side surface and a convex image-side surface, the positive refractive power of the second lens element can be enhanced.

The third lens element with negative refractive power can correct the aberration generated from the second lens element with positive refractive power. The third lens element has a concave object-side surface and a concave image-side surface, so that the curvature of the surfaces of the third lens element can enhance the capability thereof for correcting the aberration.

The fifth lens element with positive refractive power has a convex image-side surface. Therefore, the refractive power of the fifth lens element can effectively correct the high order aberration of the image capturing lens assembly, and the resolving power of the image capturing lens assembly can be enhanced for retaining high image quality.

The sixth lens element with negative power has a concave image-side surface, so that the principal point of the image capturing lens assembly can be positioned away from the image plane, and the total track length of the image capturing lens assembly can be reduced so as to maintain the compact size of the image capturing lens assembly. Furthermore, the sixth lens element has at least one inflection point formed on the image-side surface thereof. Therefore, the incident angle of the off-axis field on the image sensor can be effectively minimized and the aberration can be corrected as well.

When a focal length of the image capturing lens assembly is f, and a focal length of the third lens element is f3, the following relationship is satisfied:

$$|f/f3|>0.5.$$

Therefore, the refractive power of the third lens element is proper which can correct the aberration of the image capturing lens assembly effectively.

The image capturing lens assembly further includes a stop, such as an aperture stop. When an axial distance between the stop and the image-side surface of the sixth lens element is SD, and an axial distance between the object-side surface of the first lens element and the image-side surface of the sixth lens element is TD, the following relationship is satisfied:

$$0.7<SD/TD<1.2.$$

If SD/TD<0.7, the angle of incidence on the image sensor would be too to large, which would cause poor photographic performance of the image sensor as well as excessive chromatic aberration within the image capturing lens assembly. If SD/TD>1.2, the total track length of the image capturing lens assembly would be too long. Therefore, when SD/TD satisfies the above relationship, the image capturing lens assembly can have a good balance between the telecentric and wide-angle characteristics, as well as a desirable total track length of the image capturing lens assembly.

When a curvature radius of the object-side surface of the fifth lens element is R9, and a curvature radius of the image-side surface of the fifth lens element is R10, the following relationship is satisfied:

$$0.1<(R9-R10)/(R9+R10)<0.8.$$

Therefore, the curvature of the surfaces of the fifth lens element is proper, so that the astigmatism of the image capturing lens assembly can be further corrected.

When a maximum image height of the image capturing lens assembly is ImgH, and the focal length of the image capturing lens assembly is f, the following relationship is satisfied:

$$ImgH/f>0.65.$$

Therefore, a sufficient angle of view of the image capturing lens assembly can be ensured, and the compact size of the image capturing lens assembly can be maintained.

ImgH and f can further satisfy the following relationship:

$$ImgH/f>0.72.$$

When the focal length of the image capturing lens assembly is f, a focal length of the first lens element is f1, and a focal length of the second lens element is f2, the following relationship is satisfied:

$$0.3<(f/f1)+(f/f2)<3.5.$$

Therefore, the total track length would be proper by the adjustment from the refractive power of the first lens element and the second lens element.

f, f1 and f2 can further satisfy the following relationship:

$$0.7<(f/f1)+(f/f2)<2.0.$$

When the focal length of the image capturing lens assembly is f, and a focal length of the fifth lens element is f5, the following relationship is satisfied:

$$f/f5>0.6.$$

Therefore, the positive refractive power of the fifth lens element can provides a distribution of the image capturing lens assembly for reducing the sensitivity in manufacturing tolerance thereof.

When a central thickness of the fifth lens element is CT5, and a central thickness of the sixth lens element is CT6, the following relationship is satisfied:

$$0.3<CT5/CT6<1.0.$$

Therefore, the thickness of the fifth lens element and the sixth lens element can reduce the total track length of the image capturing lens assembly.

When a distance between an off-axis point with a tangent line perpendicular to the optical axis on the image-side surface and the optical axis is Yc, and the focal length of the image capturing lens assembly is f, the following relationship is satisfied:

$$0.1<Yc/f<0.6.$$

Therefore, the sufficient angle of view of the image capturing lens assembly can be further ensured, and the incident angle of the off-axis field of light on the image sensor can be effectively minimized and the aberration of the off-axis field can be corrected.

When the refraction index of the second lens element is N2, the refraction index of the third lens element is N3, the Abbe number of the first lens element is V1, and the Abbe number of the second lens element is V2, the following relationships are satisfied:

$$-2.0<(N2-N3)\times 10<-0.5;$$

$$|V1-V2|<15; \text{ and}$$

$$V2>28.$$

Therefore, when the material of the lens elements satisfy the foregoing relationship, the capability of the image capturing lens assembly for correcting the chromatic aberration can be enhanced.

When a curvature radius of the image-side surface of the sixth lens element is R12, and the focal length of the image capturing lens assembly is f, the following relationship is satisfied:

$$0.2<R12/f<0.4.$$

Therefore, the principal point of the image capturing lens assembly can be positioned away from the image plane by the curvature of the image-side surface of the sixth lens element, and the total track length of the image capturing lens assembly can be reduced.

The image capturing lens assembly of the present disclosure includes at least four lens elements which are made of plastic material. When the lens elements are made of plastic material, the cost of manufacture can be effectively reduced. The lens elements also can be made of glass material, so that there is higher degree of freedom in setting the range of the refractive power of the image capturing lens assembly. Furthermore, the surface of each lens element can be aspheric, so that it is easier to make the surface into other non-spherical shapes. Thus, more controllable parameters are obtained, the aberration is reduced, and the number of required lens elements can also be reduced. Therefore, the total track length of the image capturing lens assembly can be reduced.

According to the image capturing lens assembly of the present disclosure, when the lens element has a convex surface, it indicates that the paraxial region of the surface is convex, and when the lens element has a concave surface, it indicates that the paraxial region of the surface is concave.

According to the image capturing lens assembly of the present disclosure, the image capturing lens assembly can include at least one stop for reducing stray light to obtain higher image quality, limiting the field size, or other functionalities. Furthermore, when the stop is an aperture stop, the position of the aperture stop within an optical system can be arbitrarily placed in front of the entire optical system or within the optical system in accordance with the designer's preference of the optical system, in order to achieve the desirable optical features or higher image quality produced from the optical system.

According to the above description of the present disclosure, the following 1st-8th specific embodiments are provided for further explanation.

Figure 2:
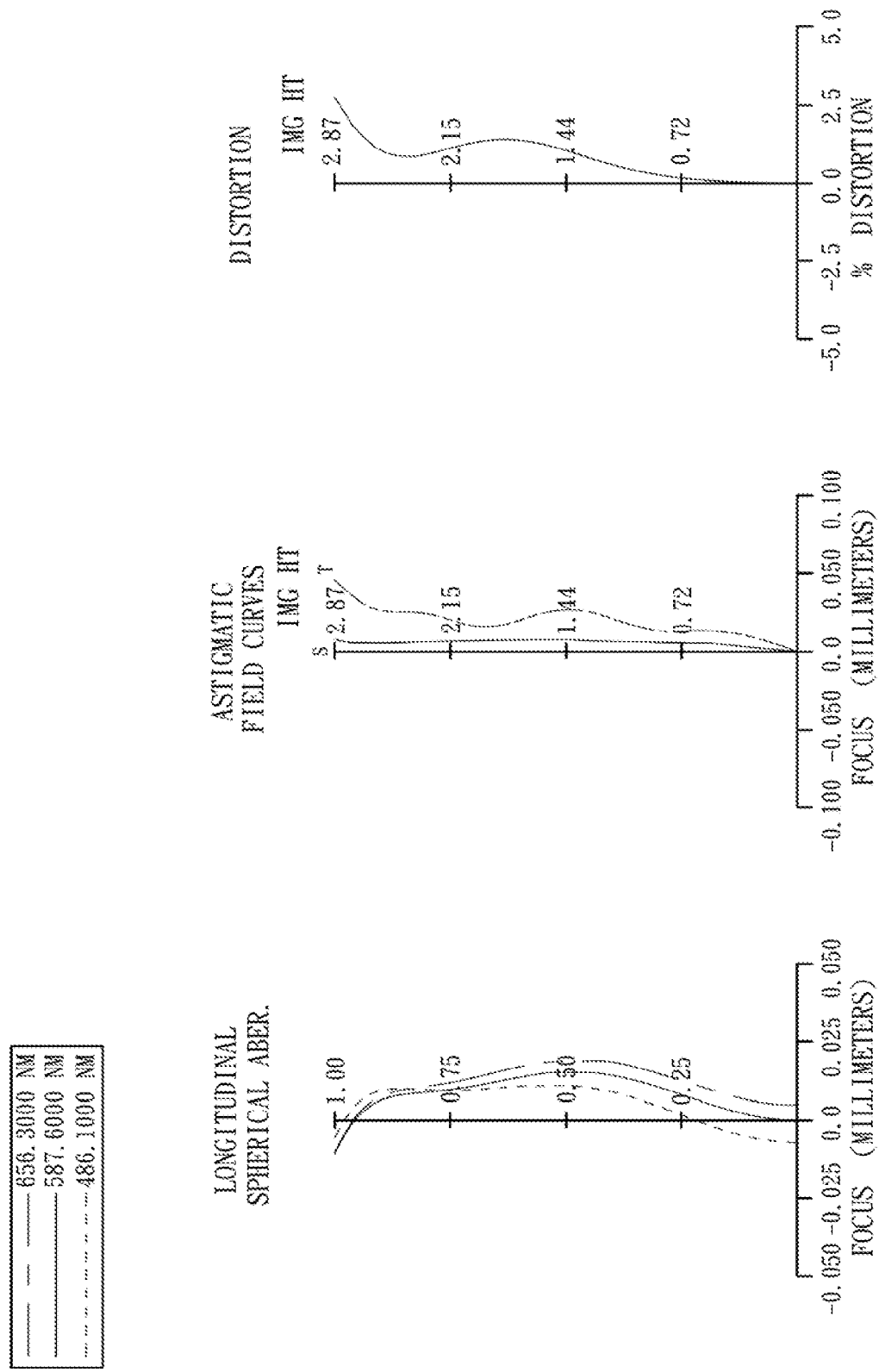
FIG. 2 shows spherical aberration curves, astigmatic field curves and a distortion curve of the image capturing lens assembly according to the first embodiment.

FIG. 1 is a schematic view of an image capturing lens assembly according to the first embodiment of the present disclosure. FIG. 2 shows spherical aberration curves, astigmatic field curves and a distortion curve of the image capturing lens assembly according to the first embodiment. In FIG. 1, the image capturing lens assembly includes, in order from an object side to an image side, the first lens element 110, an aperture stop 100, the second lens element 120, the third lens element 130, the fourth lens element 140, the fifth lens element 150, the sixth lens element 160, an IR (infrared) cut filter 180 and an image plane 170.

The first lens element 110 is made of plastic material. The first lens element 110 with positive refractive power has a convex object-side surface 111 and a concave image-side surface 112. The object-side surface 111 and the image-side surface 112 of the first lens element 110 are aspheric.

The second lens element 120 is made of plastic material. The second lens element 120 with positive refractive power has a convex object-side surface 121 and a convex image-side surface 122. The object-side surface 121 and the image-side surface 122 of the second lens element 120 are aspheric.

The third lens element 130 is made of plastic material. The third lens element 130 with negative refractive power has a concave object-side surface 131 and a concave image-side surface 132. The object-side surface 131 and the image-side surface 132 of the third lens element 130 are aspheric.

The fourth lens element 140 is made of plastic material. The fourth lens element 140 with positive refractive power has a convex object-side surface 141 and a convex image-side surface 142. The object-side surface 141 and the image-side surface 142 of the fourth lens element 140 are aspheric.

The fifth lens element 150 is made of plastic material. The fifth lens element 150 with positive refractive power has a concave object-side surface 151 and a convex image-side surface 152. The object-side surface 151 and the image-side surface 152 of the fifth lens element 150 are aspheric.

The sixth lens element 160 is made of plastic material. The sixth lens element 160 with negative refractive power has a concave object-side surface 161 and a concave image-side surface 162. The object-side surface 161 and the image-side surface 162 of the sixth lens element 160 are aspheric. The sixth lens element 160 has inflection points formed on the image-side surface 162 thereof.

The IR cut filter 180 is made of glass and located between the sixth lens element 160 and the image plane 170, and will not affect the focal length of the image capturing lens assembly.

The equation of the aspheric surface profiles of the aforementioned lens elements of the first embodiment is expressed as follows:

$$X(Y) = (Y^2/R)/(1 + sqrt(1 - (1+k) \times (Y/R)^2)) + \sum_i (Ai) \times (Y^i)$$

where:

X is the height of a point on the aspheric surface spaced at a distance Y from the optical axis relative to the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the image capturing lens assembly according to the first embodiment, when a focal length of the image capturing lens assembly is f, an f-number of the image capturing lens assembly is Fno, and a half of the maximal field of view is HFOV, these parameters have the following values:

f=3.87 mm;

Fno=2.80; and

HFOV=35.7 degrees.

In the image capturing lens assembly according to the first embodiment, when the Abbe number of the first lens element 110 is V1, and the Abbe number of the second lens element 120 is V2, the following relationships are satisfied:

$V2=55.8$; and $|V1-V2|=0.5$.

In the image capturing lens assembly according to the first embodiment, when the refraction index of the second lens element 120 is N2, and the refraction index of the third lens element 130 is N3, the following relationship is satisfied:

$(N2-N3) \times 10=-1.04$.

In the image capturing lens assembly according to the first embodiment, when a central thickness of the fifth lens element 150 is CT5, and a central thickness of the sixth lens element 160 is CT6, the following relationship is satisfied:

$CT5/CT6=0.68$.

In the image capturing lens assembly according to the first embodiment, when a curvature radius of the object-side surface 151 of the fifth lens element 150 is R9, and a curvature radius of the image-side surface 152 of the fifth lens element 150 is R10, a curvature radius of the image-side surface 162 of the sixth lens element 160 is R12, and the focal length of the image capturing lens assembly is f, the following relationships are satisfied:

$(R9-R10)/(R9+R10)=0.27$; and $R12/f=0.30$.

In the image capturing lens assembly according to the first embodiment, when the focal length of the image capturing lens assembly is f, a focal length of the first lens element 110 is f1, a focal length of the second lens element 120 is f2, a focal length of the third lens element 130 is f3, and a focal length of the fifth lens element 150 is f5, the following relationships are satisfied:

$(f/f1)+(f/f2)=1.10$;

$|f/f3|=0.89$; and $f/f5=1.20$.

Figure 17:
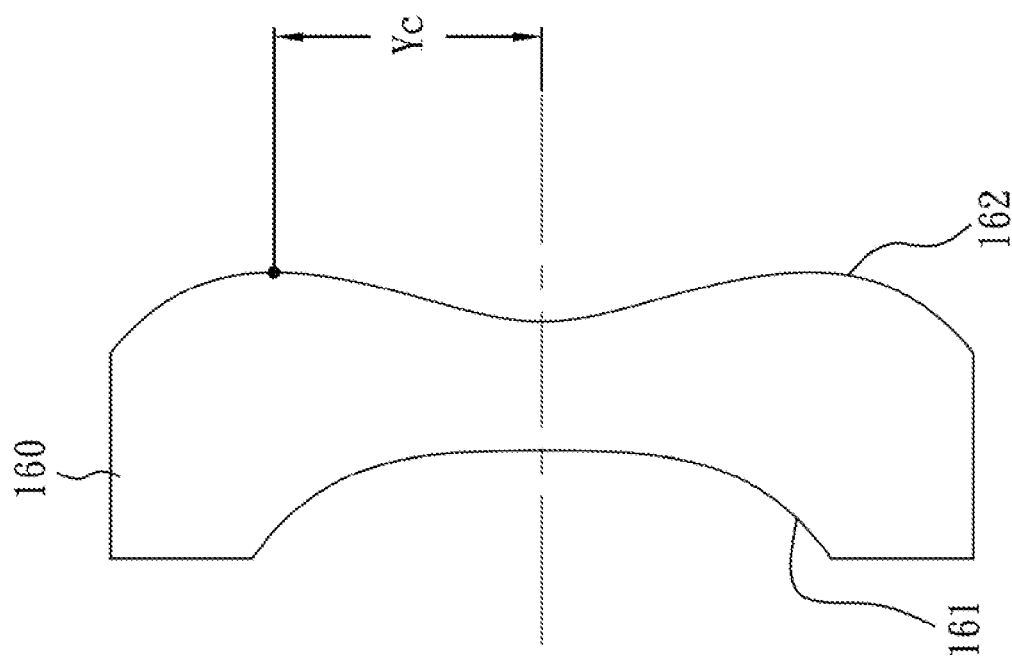
FIG. 17 shows Yc of the sixth lens element according to the first embodiment of the present disclosure.

FIG. 17 shows Yc of the sixth lens element according to the first embodiment of the present disclosure. In the image capturing lens assembly according to the first embodiment, a distance between an off-axis point with a tangent line perpendicular to the optical axis on the image-side surface and the optical axis is Yc, and the focal length of the image capturing lens assembly is f, the following relationship is satisfied:

$Yc/f=0.36$.

In the image capturing lens assembly according to the first embodiment, when an axial distance between the stop 100 and the image-side surface 162 of the sixth lens element 160 is SD, and an axial distance between the object-side surface 111 of the first lens element 110 and the image-side surface 162 of the sixth lens element 160 is TD, the following relationship is satisfied:

$SD/TD=0.89$.

In the image capturing lens assembly according to the first embodiment, when a half of a maximum image height of the image capturing lens assembly ImgH, the focal length of the image capturing lens assembly is f, and an axial distance between the object-side surface 111 of the first lens element 110 and the image plane 170 is TTL, the following relationships are satisfied:

$ImgH/f=0.74$; and $TTL/ImgH=1.81$.

The detailed optical data of the first embodiment are shown in Table 1 and the aspheric surface data are shown in Table 2 below.

TABLE 1

1st Embodiment
f = 3.87 mm, Fno = 2.80, HFOV = 35.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.299380 (ASP) | 0.390 | Plastic | 1.535 | 56.3 | 6.70 |
| 2 | | 6.042600 (ASP) | 0.065 | | | | |
| 3 | Ape. Stop | Plano | 0.052 | | | | |

TABLE 1-continued

1st Embodiment
f = 3.87 mm, Fno = 2.80, HFOV = 35.7 deg.

| Surface # | | Curvature Radius | Thickness | Material | Index | Abbe # | Focal length |
|---|---|---|---|---|---|---|---|
| 4 | Lens 2 | 3.957100 (ASP) | 0.397 | Plastic | 1.530 | 55.8 | 7.42 |
| 5 | | −623.630000 (ASP) | 0.201 | | | | |
| 6 | Lens 3 | −4.270400 (ASP) | 0.322 | Plastic | 1.634 | 23.8 | −4.34 |
| 7 | | 7.961400 (ASP) | 0.180 | | | | |
| 8 | Lens 4 | 17.774100 (ASP) | 0.708 | Plastic | 1.544 | 55.9 | 3.61 |
| 9 | | −2.176520 (ASP) | 0.411 | | | | |
| 10 | Lens 5 | −1.591770 (ASP) | 0.460 | Plastic | 1.544 | 55.9 | 3.24 |
| 11 | | −0.921370 (ASP) | 0.215 | | | | |
| 12 | Lens 6 | −10.195200 (ASP) | 0.679 | Plastic | 1.544 | 55.9 | −1.86 |
| 13 | | 1.148330 (ASP) | 0.700 | | | | |
| 14 | IR-filter | Plano | 0.210 | Glass | 1.517 | 64.2 | — |
| 15 | | Plano | 0.280 | | | | |
| 16 | Image | Plano | — | | | | |

Note:
Reference wavelength (d-line) is 587.6 nm.

TABLE 2

Aspheric Coefficients

| | Surface # | | | | | |
|---|---|---|---|---|---|---|
| | 1 | 2 | 4 | 5 | 6 | 7 |
| k = | −1.82770E+01 | −1.00000E+00 | −1.21404E+01 | −1.00000E+00 | −1.00000E+00 | 5.00000E+01 |
| A4 = | 1.91789E−01 | −1.63020E−02 | −5.01679E−02 | −1.51877E−01 | −2.06738E−01 | −1.26479E−01 |
| A6 = | −1.89726E−01 | 3.80545E−02 | −8.15397E−02 | −1.28738E−01 | −1.38152E−01 | −3.70087E−02 |
| A8 = | 1.88618E−01 | −1.29000E−01 | 2.88822E−01 | 8.80583E−02 | 2.60074E−01 | 1.03657E−01 |
| A10 = | −9.73631E−02 | 3.96421E−01 | −1.03025E+00 | −4.02823E−01 | −5.05031E−01 | −8.89162E−02 |
| A12 = | 4.72165E−02 | −5.62962E−01 | 1.41232E+00 | 4.54029E−01 | 3.50501E−01 | 1.39116E−02 |
| A14 = | −2.85768E−02 | 3.20589E−01 | −6.99005E−01 | −1.16216E−01 | | |

| | Surface # | | | | | |
|---|---|---|---|---|---|---|
| | 8 | 9 | 10 | 11 | 12 | 13 |
| k = | −5.00000E+01 | 5.64394E−01 | 2.02874E−01 | −3.51178E+00 | −1.00000E+00 | −6.87251E+00 |
| A4 = | −7.00177E−02 | −4.89152E−02 | 4.87853E−02 | −1.17333E−01 | −6.43680E−02 | −6.52552E−02 |
| A6 = | 4.93941E−02 | 1.18427E−02 | 8.26370E−03 | 1.53898E−01 | −1.85155E−02 | 2.29997E−02 |
| A8 = | −2.05580E−01 | −5.76545E−03 | 2.67704E−03 | −1.35653E−01 | 7.33201E−03 | −7.82960E−03 |
| A10 = | 2.74126E−01 | −7.16060E−03 | 3.26837E−03 | 6.94703E−02 | −1.79664E−03 | 1.58772E−03 |
| A12 = | −1.94034E−01 | | | −1.46465E−02 | −8.68730E−05 | −1.92529E−04 |
| A14 = | 4.73734E−02 | | | 7.42093E−04 | 1.16993E−04 | 1.05196E−05 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A14 represent the aspheric coefficients ranging from the 1st order to the 14th order. This information related to Table 1 and Table 2 applies also to the Tables for the remaining embodiments, and so an explanation in this regard will not be provided again.

Figure 3:
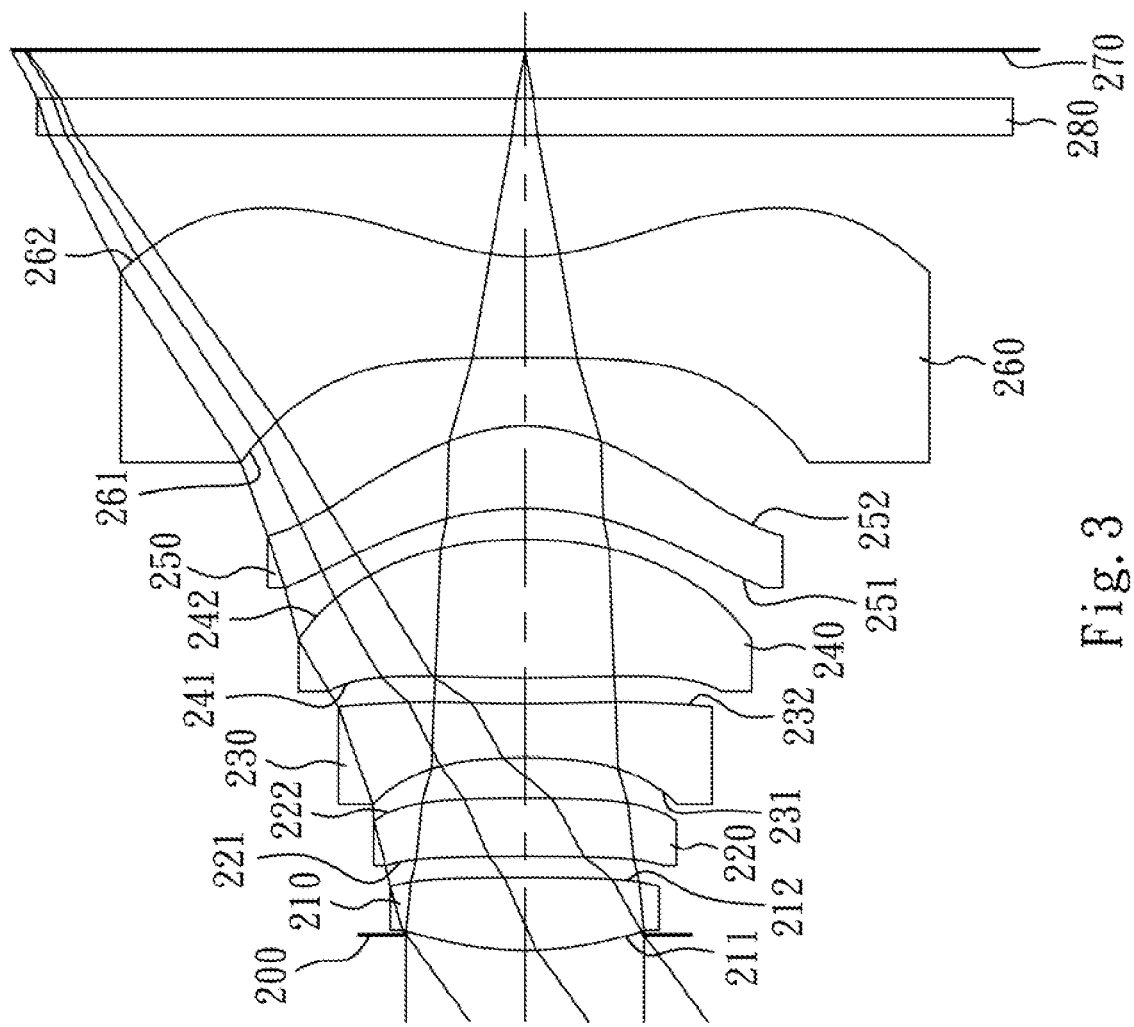
FIG. 3 is a schematic view of an image capturing lens assembly according to the second embodiment of the present disclosure.
Figure 4:
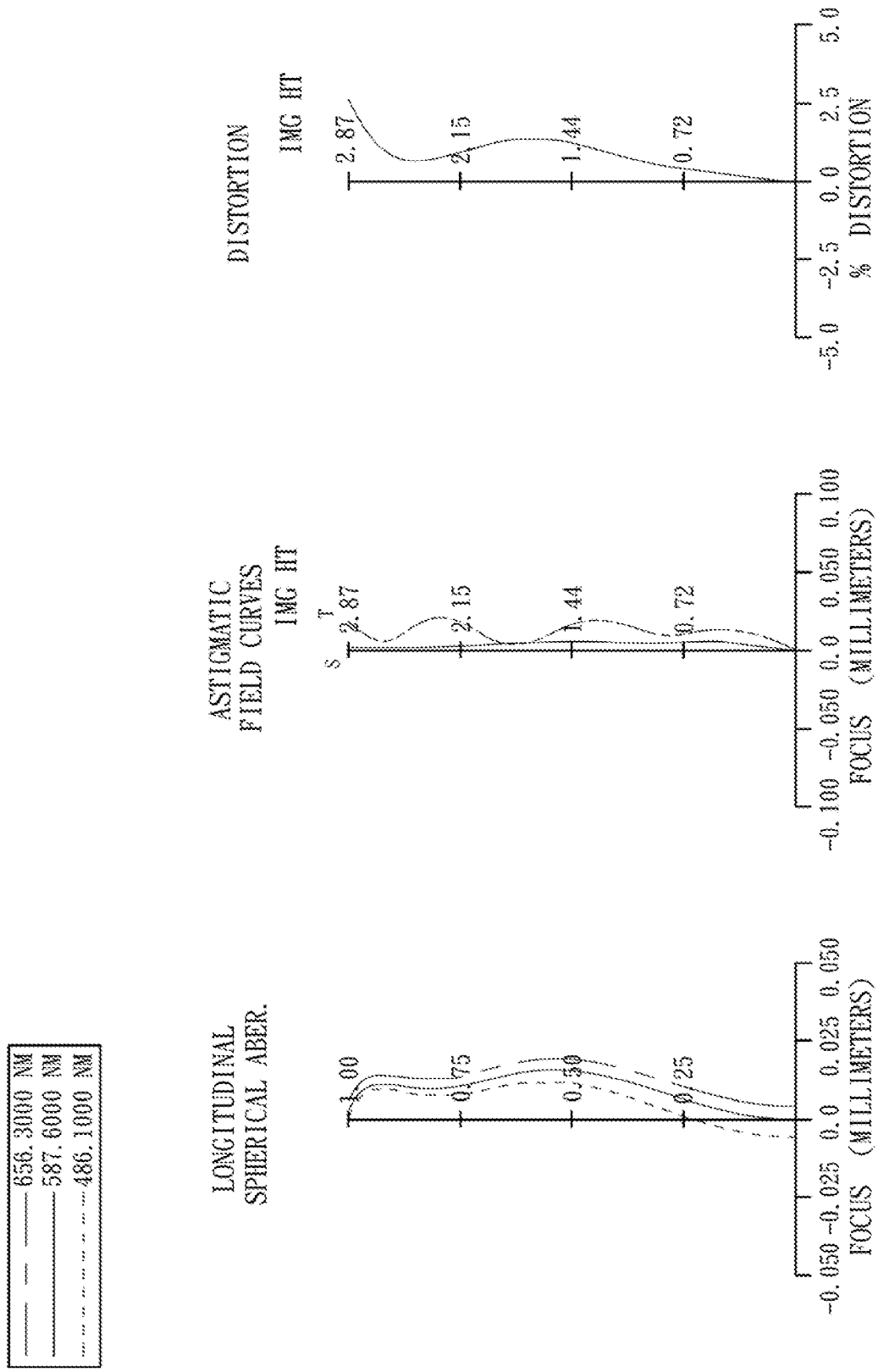
FIG. 4 shows spherical aberration curves, astigmatic field curves and a distortion curve of the image capturing lens assembly according to the second embodiment.

FIG. 3 is a schematic view of an image capturing lens assembly according to the second embodiment of the present disclosure. FIG. 4 shows spherical aberration curves, astigmatic field curves and a distortion curve of the image capturing lens assembly according to the second embodiment. In FIG. 3, the image capturing lens assembly includes, in order from an object side to an image side, an aperture stop 200, the first lens element 210, the second lens element 220, the third lens element 230, the fourth lens element 240, the fifth lens element 250, the sixth lens element 260, an IR cut filter 280 and an image plane 270.

The first lens element 210 is made of plastic material. The first lens element 210 with positive refractive power has a convex object-side surface 211 and a convex image-side surface 212. The object-side surface 211 and the image-side surface 212 of the first lens element 210 are aspheric.

The second lens element 220 is made of plastic material. The second lens element 220 with positive refractive power has a concave object-side surface 221 and a convex image-side surface 222. The object-side surface 221 and the image-side surface 222 of the second lens element 220 are aspheric.

The third lens element 230 is made of plastic material. The third lens element 230 with negative refractive power has a concave object-side surface 231 and a concave image-side surface 232. The object-side surface 231 and the image-side surface 232 of the third lens element 230 are aspheric.

The fourth lens element 240 is made of plastic material. The fourth lens element 240 with positive refractive power has a convex object-side surface 241 and a convex image-side surface 242. The object-side surface 241 and the image-side surface 242 of the fourth lens element 240 are aspheric.

The fifth lens element 250 is made of plastic material. The fifth lens element 250 with positive refractive power has a concave object-side surface 251 and a convex image-side surface 252. The object-side surface 251 and the image-side surface 252 of the fifth lens element 250 are aspheric.

The sixth lens element 260 is made of plastic material. The sixth lens element 260 with negative refractive power has a concave object-side surface 261 and a concave image-side surface 262. The object-side surface 261 and the image-side surface 262 of the sixth lens element 260 are aspheric. The sixth lens element 260 has inflection points formed on the image-side surface 262 thereof.

The IR cut filter 280 is made of glass and located between the sixth lens element 260 and the image plane 270, and will not affect the focal length of the image capturing lens assembly.

The equation of the aspheric surface profiles of the above lens elements of the second embodiment is the same as that of the first embodiment, and will not be stated herein again.

The detailed optical data of the second embodiment are shown in Table 3 and the aspheric surface data are shown in Table 4 below.

TABLE 3

2nd Embodiment
f = 3.82 mm, Fno = 2.80, HFOV = 36.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.090 | | | | |
| 2 | Lens 1 | 2.018040 (ASP) | 0.417 | Plastic | 1.514 | 56.8 | 3.56 |
| 3 | | −18.011600 (ASP) | 0.119 | | | | |
| 4 | Lens 2 | −28.172900 (ASP) | 0.339 | Plastic | 1.583 | 30.2 | 76.71 |
| 5 | | −17.365200 (ASP) | 0.231 | | | | |
| 6 | Lens 3 | −3.420100 (ASP) | 0.306 | Plastic | 1.634 | 23.8 | −3.76 |
| 7 | | 8.166700 (ASP) | 0.150 | | | | |
| 8 | Lens 4 | 11.917400 (ASP) | 0.796 | Plastic | 1.544 | 55.9 | 3.65 |
| 9 | | −2.330000 (ASP) | 0.180 | | | | |
| 10 | Lens 5 | −1.628780 (ASP) | 0.470 | Plastic | 1.544 | 55.9 | 3.59 |
| 11 | | −0.978890 (ASP) | 0.391 | | | | |
| 12 | Lens 6 | −29.496300 (ASP) | 0.577 | Plastic | 1.544 | 55.9 | −2.07 |
| 13 | | 1.181560 (ASP) | 0.700 | | | | |
| 14 | IR-filter | Plano | 0.210 | Glass | 1.517 | 64.2 | — |
| 15 | | Plano | 0.282 | | | | |
| 16 | Image | Plano | — | | | | |

Note:
Reference wavelength (d-line) is 587.6 nm.

TABLE 4

Aspheric Coefficients

| | Surface # | | | | | |
|---|---|---|---|---|---|---|
| | 2 | 3 | 4 | 5 | 6 | 7 |
| k = | −1.27895E+01 | −1.00000E+00 | −1.91450E+01 | −1.00000E+00 | −1.00000E+00 | 4.78716E+01 |
| A4 = | 1.80790E−01 | −4.13520E−02 | −5.24012E−02 | −1.25197E−01 | −2.36532E−01 | −1.15265E−01 |
| A6 = | −2.45193E−01 | −2.22245E−02 | −4.00804E−02 | −7.55759E−02 | −1.02026E−01 | −3.04082E−02 |
| A8 = | 2.70980E−01 | −1.72000E−01 | 1.98912E−01 | 1.09887E−01 | 2.60277E−01 | 1.16782E−01 |
| A10 = | −3.10815E−01 | 2.57721E−01 | −1.01823E+00 | −4.66722E−01 | −5.04569E−01 | −7.60588E−02 |
| A12 = | 4.72163E−02 | −5.62962E−01 | 1.41611E+00 | 4.54599E−01 | 3.50965E−01 | 1.28235E−02 |
| A14 = | −2.85768E−02 | 3.20589E−01 | −6.99005E−01 | −1.14125E−01 | | |

| | Surface # | | | | | |
|---|---|---|---|---|---|---|
| | 8 | 9 | 10 | 11 | 12 | 13 |
| k = | −9.30822E+00 | 4.79334E−01 | 1.75671E−01 | −3.43112E+00 | −1.00000E+00 | −5.49365E+00 |
| A4 = | −5.06414E−02 | −5.34204E−02 | 5.33576E−02 | −1.10781E−01 | −6.62049E−02 | −6.89844E−02 |
| A6 = | 4.41101E−02 | 1.40910E−02 | 9.18402E−03 | 1.54508E−01 | −2.40437E−02 | 2.29949E−02 |
| A8 = | −2.03744E−01 | −1.78118E−03 | 3.17603E−03 | −1.36553E−01 | 1.09879E−02 | −7.50639E−03 |
| A10 = | 2.87196E−01 | −4.28535E−03 | 3.17178E−03 | 6.92631E−02 | −1.13304E−03 | 1.60015E−03 |
| A12 = | −1.88618E−01 | | | −1.46475E−02 | −1.84267E−04 | −2.06956E−04 |
| A14 = | 4.34970E−02 | | | 7.27960E−04 | 2.71214E−05 | 1.19296E−05 |

In the image capturing lens assembly according to the second embodiment, the definitions of f, Fno, HFOV, V1, V2, N2, N3, CT5, CT6, R9, R10, R12, f1, f2, f3, f5, Yc, SD, TD, ImgH and TTL are the same as those stated in the first embodiment with corresponding values for the second embodiment. Moreover, these parameters can be calculated from Table 3 as the following values and satisfy the following relationships:

| | |
|---|---|
| f (mm) | 3.82 |
| Fno | 2.80 |
| HFOV (deg.) | 36.2 |
| V2 | 30.2 |
| |V1 − V2| | 26.6 |
| (N2 − N3)*10 | −0.51 |
| CT5/CT6 | 0.81 |
| (R9 − R10)/(R9 + R10) | 0.25 |
| R12/f | 0.31 |
| (f/f1) + (f/f2) | 1.12 |
| |f/f3| | 1.01 |
| f/f5 | 1.06 |
| Yc/f | 0.38 |
| SD/TD | 0.98 |
| ImgH/f | 0.75 |
| TTL/ImgH | 1.78 |

Figure 5:
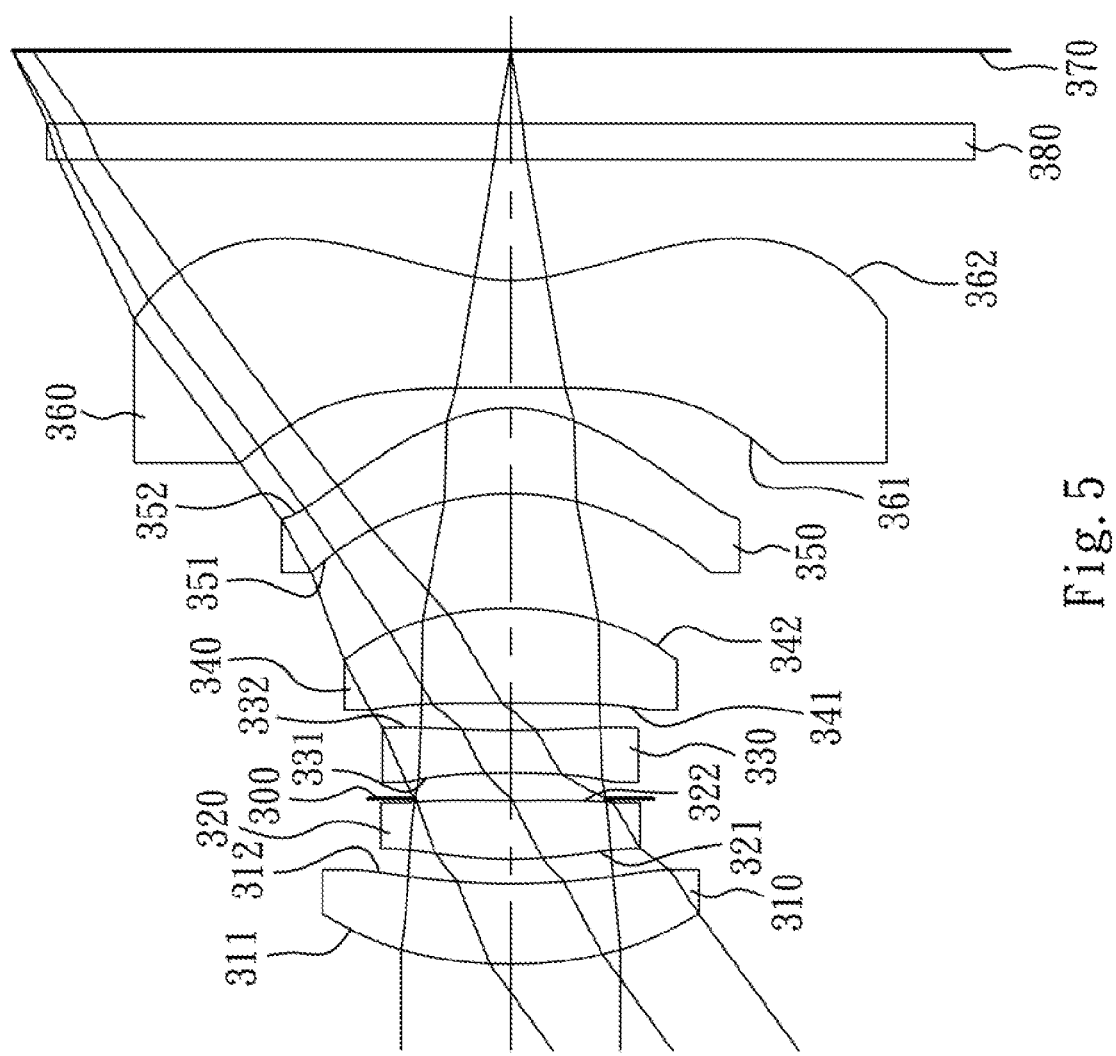
FIG. 5 is a schematic view of an image capturing lens assembly according to the third embodiment of the present disclosure.
Figure 6:
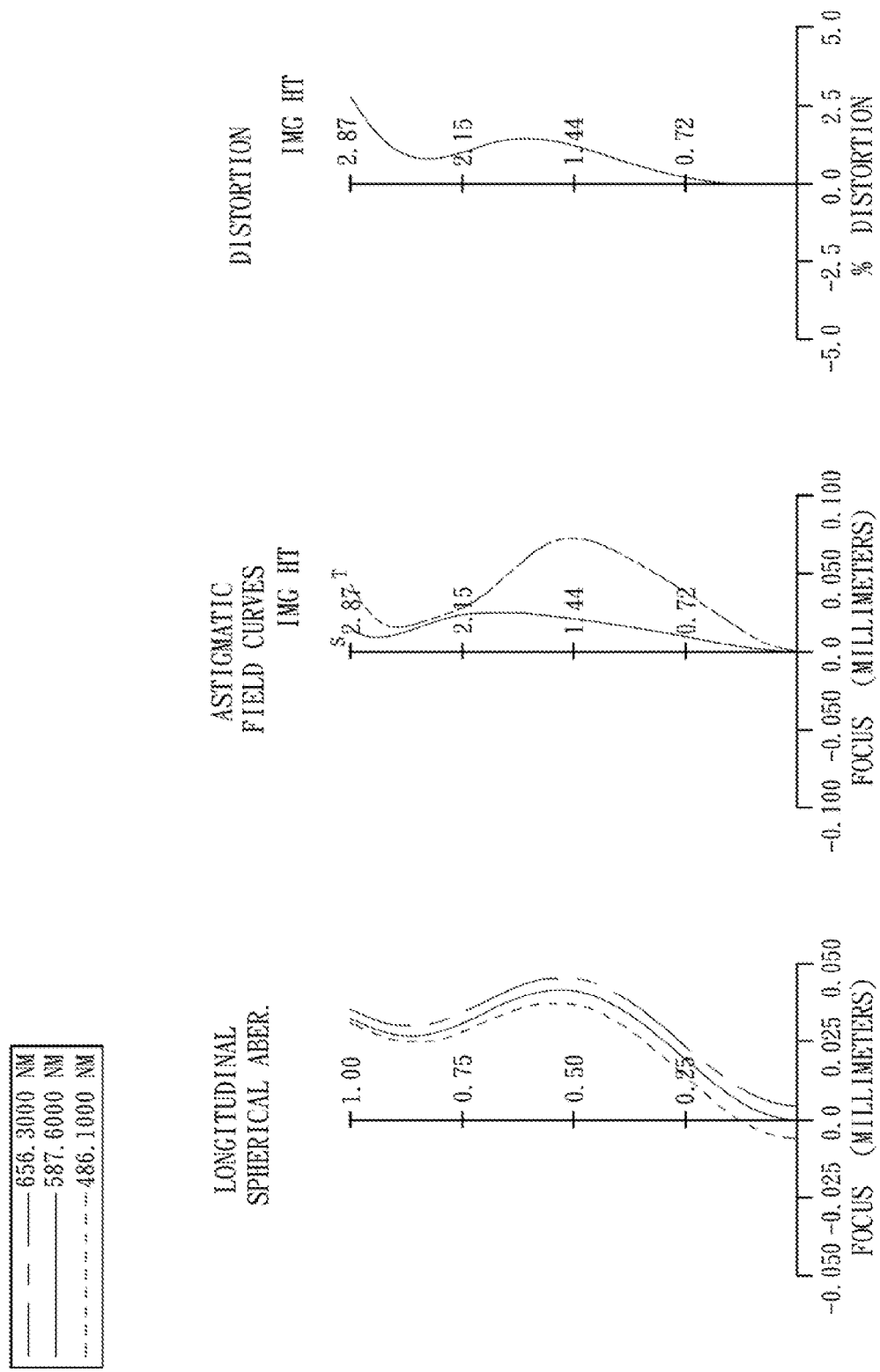
FIG. 6 shows spherical aberration curves, astigmatic field curves and a distortion curve of the image capturing lens assembly according to the third embodiment.

FIG. 5 is a schematic view of an image capturing lens assembly In according to the third embodiment of the present disclosure. FIG. 6 shows spherical aberration curves, astigmatic field curves and a distortion curve of the image capturing lens assembly according to the third embodiment. In FIG. 5, the image capturing lens assembly includes, in order from an object side to an image side, the first lens element 310, the second lens element 320, an aperture stop 300, the third lens element 330, the fourth lens element 340, the fifth lens element 350, the sixth lens element 360, an IR cut filter 380 and an image plane 370.

The first lens element 310 is made of plastic material. The first lens element 310 with positive refractive power has a convex object-side surface 311 and a concave image-side surface 312. The object-side surface 311 and the image-side surface 312 of the first lens element 310 are aspheric.

The second lens element 320 is made of plastic material. The second lens element 320 with positive refractive power has a convex object-side surface 321 and a concave image-side surface 322. The object-side surface 321 and the image-side surface 322 of the second lens element 320 are aspheric.

The third lens element 330 is made of plastic material. The third lens element 330 with negative refractive power has a concave object-side surface 331 and a concave image-side surface 332. The object-side surface 331 and the image-side surface 332 of the third lens element 330 are aspheric.

The fourth lens element 340 is made of plastic material. The fourth lens element 340 with positive refractive power has a concave object-side surface 341 and a convex image-side surface 342. The object-side surface 341 and the image-side surface 342 of the fourth lens element 340 are aspheric.

The fifth lens element 350 is made of plastic material. The fifth lens element 350 with positive refractive power has a concave object-side surface 351 and a convex image-side surface 352. The object-side surface 351 and the image-side surface 352 of the fifth lens element 350 are aspheric.

The sixth lens element 360 is made of plastic material. The sixth lens element 360 with negative refractive power has a concave object-side surface 361 and a concave image-side surface 362. The object-side surface 361 and the image-side surface 362 of the sixth lens element 360 are aspheric. The sixth lens element 360 has inflection points formed on the image-side surface 362 thereof.

The IR cut filter 380 is made of glass and located between the sixth lens element 360 and the image plane 370, and will not affect the focal length of the image capturing lens assembly.

The equation of the aspheric surface profiles of the above lens elements of the third embodiment is the same as that of the first embodiment, and will not be stated herein again.

The detailed optical data of the third embodiment are shown in Table 5 and the aspheric surface data are shown in Table 6 below.

TABLE 5

3rd Embodiment
f = 3.80 mm, Fno = 3.00, HFOV = 36.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.533660 (ASP) | 0.467 | Plastic | 1.530 | 55.8 | 12.14 |
| 2 | | 3.913500 (ASP) | 0.142 | | | | |
| 3 | Lens 2 | 2.480300 (ASP) | 0.334 | Plastic | 1.530 | 55.8 | 5.13 |
| 4 | | 27.208600 (ASP) | 0.010 | | | | |
| 5 | Ape. Stop | Plano | 0.150 | | | | |
| 6 | Lens 3 | −5.261000 (ASP) | 0.250 | Plastic | 1.634 | 23.8 | −4.34 |
| 7 | | 5.864500 (ASP) | 0.154 | | | | |
| 8 | Lens 4 | −55.864500 (ASP) | 0.549 | Plastic | 1.544 | 55.9 | 3.68 |
| 9 | | −1.939770 (ASP) | 0.661 | | | | |
| 10 | Lens 5 | −1.539920 (ASP) | 0.491 | Plastic | 1.544 | 55.9 | 2.73 |
| 11 | | −0.840860 (ASP) | 0.118 | | | | |
| 12 | Lens 6 | −53.882600 (ASP) | 0.619 | Plastic | 1.544 | 55.9 | −1.90 |
| 13 | | 1.056300 (ASP) | 0.700 | | | | |
| 14 | IR-filter | Plano | 0.210 | Glass | 1.517 | 64.2 | — |
| 15 | | Plano | 0.416 | | | | |
| 16 | Image | Plano | — | | | | |

Note:
Reference wavelength (d-line) is 587.6 nm.

TABLE 6

Aspheric Coefficients

| Surface # | | | | | |
|---|---|---|---|---|---|
| 1 | 2 | 3 | 4 | 6 | 7 |
| k = −2.47599E+01 | −1.00000E+00 | −9.77047E+00 | −1.00000E+00 | −1.00000E+00 | 4.07728E+01 |
| A4 = 1.88877E−01 | −2.82714E−02 | −4.95761E−02 | −1.21831E−01 | −1.46343E−01 | −1.33106E−01 |
| A6 = −1.69231E−01 | 2.05017E−02 | −1.52095E−01 | −1.52241E−01 | −5.59075E−02 | −2.47843E−02 |
| A8 = 1.67162E−01 | 3.68193E−03 | 4.07387E−01 | 3.39318E−01 | 2.90090E−01 | 7.79486E−02 |
| A10 = −9.34924E−02 | 1.99669E−01 | −1.20493E+00 | −6.13651E−01 | −5.85972E−01 | −1.78171E−01 |
| A12 = 4.98912E−02 | −5.62962E−01 | 1.41232E+00 | 4.54029E−01 | 3.50501E−01 | 8.01383E−03 |
| A14 = −2.52553E−02 | 3.20589E−01 | −6.99005E−01 | −1.16216E−01 | | |

| Surface # | | | | | |
|---|---|---|---|---|---|
| 8 | 9 | 10 | 11 | 12 | 13 |
| k = −5.00000E+01 | 3.62201E−01 | 2.65246E−01 | −3.42114E+00 | −1.00000E+00 | −7.19617E+00 |
| A4 = −7.32250E−02 | −3.57458E−02 | 4.63023E−02 | −1.39994E−01 | −6.74725E−02 | −7.04709E−02 |
| A6 = 5.03644E−02 | 6.98321E−04 | 4.33753E−03 | 1.54297E−01 | −1.63034E−02 | 2.30152E−02 |
| A8 = −1.95341E−01 | −1.30825E−02 | −3.39695E−04 | −1.34052E−01 | 8.25661E−03 | −8.04958E−03 |
| A10 = 2.68695E−01 | −7.60589E−03 | 1.76736E−03 | 7.02831E−02 | −1.26954E−03 | 1.59891E−03 |
| A12 = −2.22164E−01 | | | −1.42688E−02 | −8.52798E−06 | −1.79357E−04 |
| A14 = 4.97004E−02 | | | 8.22794E−04 | 9.16729E−05 | 8.32491E−06 |

In the image capturing lens assembly according to the third embodiment, the definitions of f, Fno, HFOV, V1, V2, N2, N3, CT5, CT6, R9, R10, R12, f1, f2, f3, f5, Yc, SD, TD, ImgH and TTL are the same as those stated in the first embodiment with corresponding values for the third embodiment. Moreover, these parameters can be calculated from Table 5 as the following values and satisfy the following relationships:

| | |
|---|---|
| f (mm) | 3.80 |
| Fno | 3.00 |
| HFOV (deg.) | 36.2 |
| V2 | 55.8 |
| |V1 − V2| | 0.0 |
| (N2 − N3)*10 | −1.04 |
| CT5/CT6 | 0.79 |
| (R9 − R10)/(R9 + R10) | 0.29 |
| R12/f | 0.28 |
| (f/f1) + (f/f2) | 1.05 |
| |f/f3| | 0.88 |
| f/f5 | 1.39 |
| Yc/f | 0.34 |
| SD/TD | 0.76 |
| ImgH/f | 0.76 |
| TTL/ImgH | 1.81 |

Figure 7:
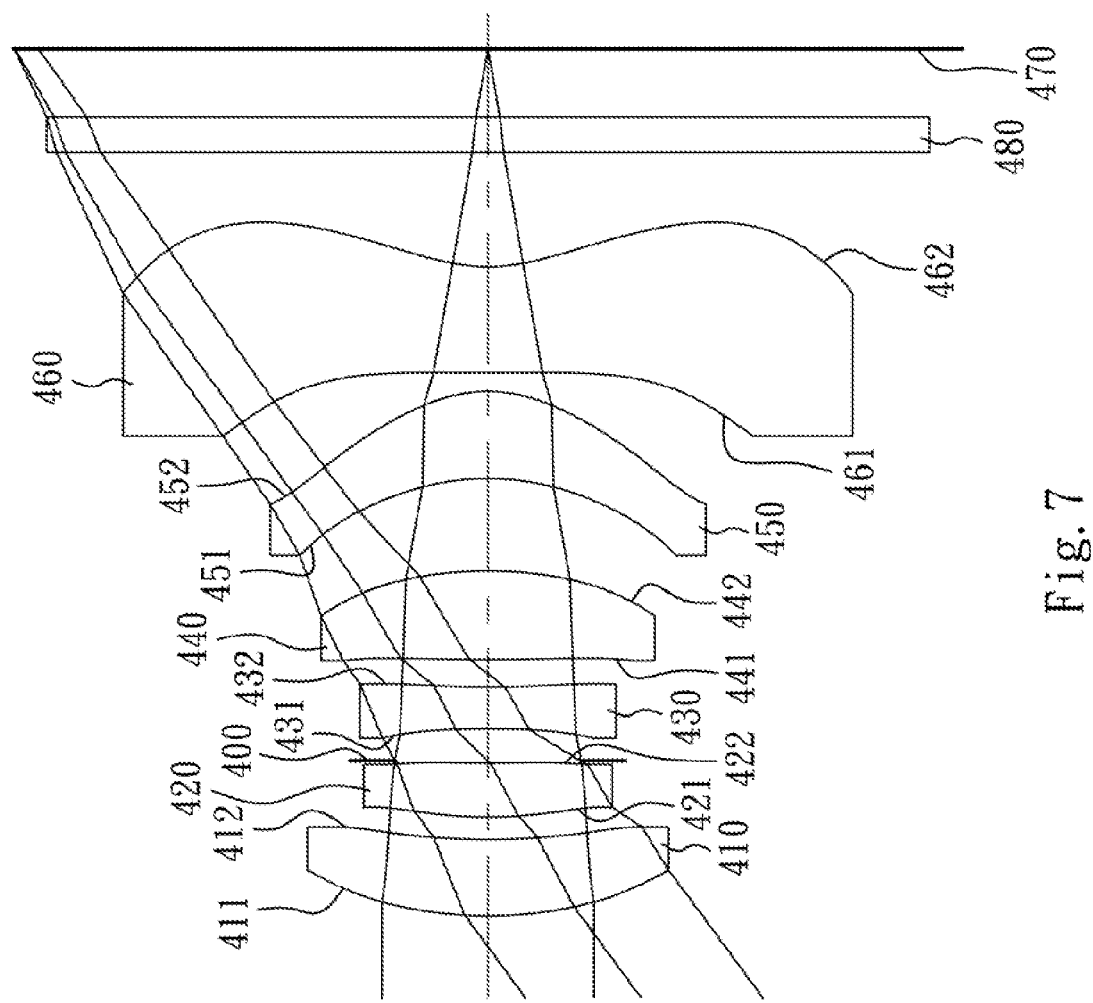
FIG. 7 is a schematic view of an image capturing lens assembly according to the fourth embodiment of the present disclosure.
Figure 8:
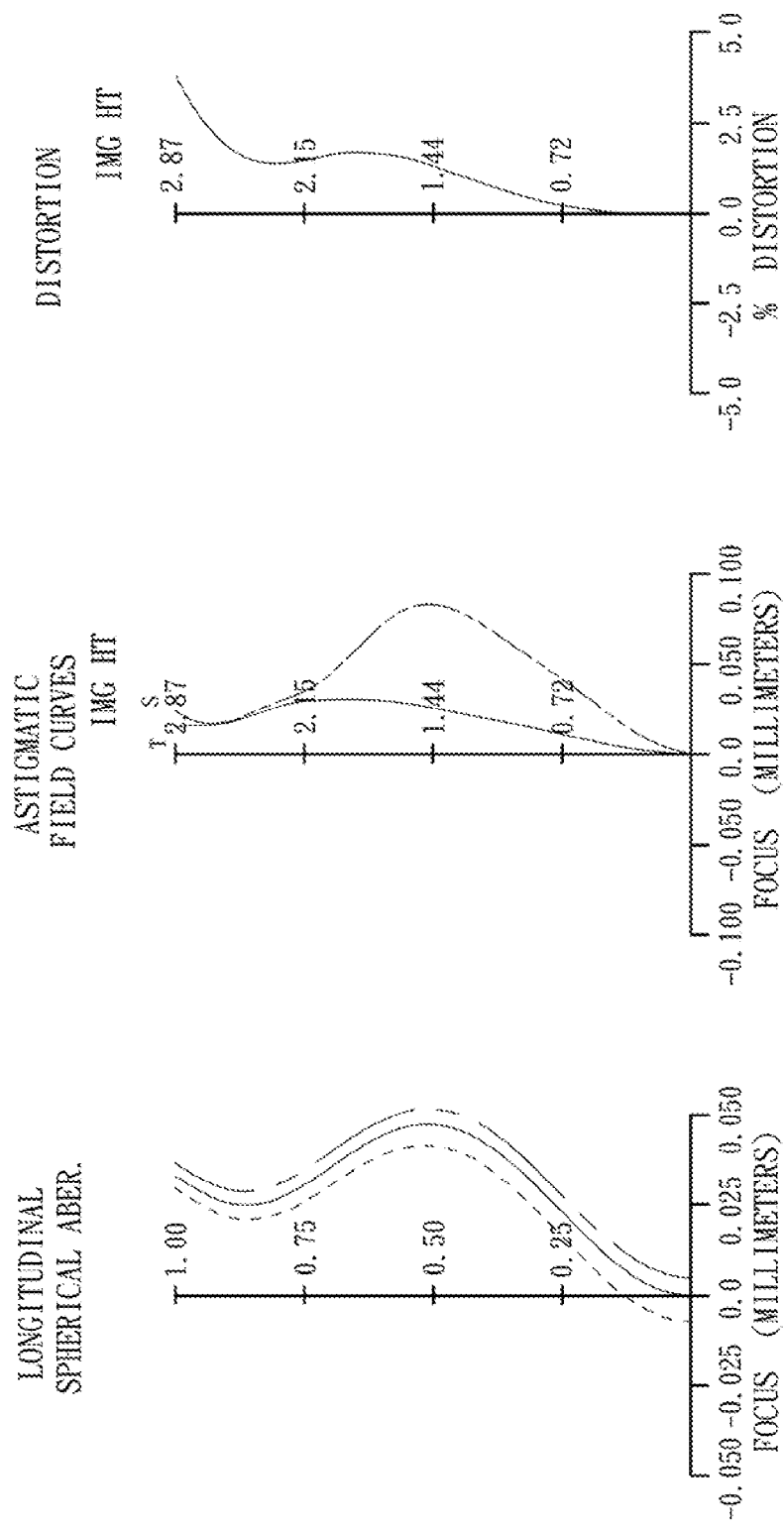
FIG. 8 shows spherical aberration curves, astigmatic field curves and a distortion curve of the image capturing lens assembly according to the fourth embodiment.

FIG. 7 is a schematic view of an image capturing lens assembly according to the fourth embodiment of the present disclosure. FIG. 8 shows spherical aberration curves, astigmatic field curves and a distortion curve of the image capturing lens assembly according to the fourth embodiment. In FIG. 7, the image capturing lens assembly includes, in order from an object side to an image side, the first lens element 410, the second lens element 420, an aperture stop 400, the third lens element 430, the fourth lens element 440, the fifth lens element 450, the sixth lens element 460, an IR cut filter 480 and an image plane 470.

The first lens element 410 is made of plastic material. The first lens element 410 with positive refractive power has a convex object-side surface 411 and a concave image-side surface 412. The object-side surface 411 and the image-side surface 412 of the first lens element 410 are aspheric.

The second lens element 420 is made of plastic material. The second lens element 420 with positive refractive power has a convex object-side surface 421 and a concave image-side surface 422. The object-side surface 421 and the image-side surface 422 of the second lens element 420 are aspheric.

The third lens element 430 is made of plastic material. The third lens element 430 with negative refractive power has a concave object-side surface 431 and a concave image-side surface 432. The object-side surface 431 and the image-side surface 432 of the third lens element 430 are aspheric.

The fourth lens element 440 is made of plastic material. The fourth lens element 440 with positive refractive power has a convex object-side surface 441 and a convex image-side surface 442. The object-side surface 441 and the image-side surface 442 of the fourth lens element 440 are aspheric.

The fifth lens element 450 is made of plastic material. The fifth lens element 450 with positive refractive power has a concave object-side surface 451 and a convex image-side surface 452. The object-side surface 451 and the image-side surface 452 of the fifth lens element 450 are aspheric.

The sixth lens element 460 is made of plastic material. The sixth lens element 460 with negative refractive power has a convex object-side surface 461 and a concave image-side surface 462. The object-side surface 461 and the image-side surface 462 of the sixth lens element 460 are aspheric. The sixth lens element 460 has inflection points formed on the image-side surface 462 thereof.

The IR cut filter 480 is made of glass and located between the sixth lens element 460 and the image plane 470, and will not affect the focal length of the image capturing lens assembly.

The equation of the aspheric surface profiles of the above lens elements of the fourth embodiment is the same as that of the first embodiment, and will not be stated herein again.

The detailed optical data of the fourth embodiment are shown in Table 7 and the aspheric surface data are shown in Table 8 below.

TABLE 7

4th Embodiment
f = 3.73 mm, Fno = 2.90, HFOV = 36.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.630010 (ASP) | 0.463 | Plastic | 1.530 | 55.8 | 12.63 |
| 2 | | 4.067700 (ASP) | 0.136 | | | | |
| 3 | Lens 2 | 2.443190 (ASP) | 0.329 | Plastic | 1.530 | 55.8 | 5.32 |
| 4 | | 17.486700 (ASP) | 0.015 | | | | |
| 5 | Ape. Stop | Plano | 0.196 | | | | |
| 6 | Lens 3 | −5.905700 (ASP) | 0.250 | Plastic | 1.634 | 23.8 | −4.44 |
| 7 | | 5.476300 (ASP) | 0.167 | | | | |
| 8 | Lens 4 | 12.183400 (ASP) | 0.538 | Plastic | 1.544 | 55.9 | 3.85 |
| 9 | | −2.494330 (ASP) | 0.565 | | | | |
| 10 | Lens 5 | −1.538330 (ASP) | 0.526 | Plastic | 1.544 | 55.9 | 2.58 |
| 11 | | −0.822770 (ASP) | 0.116 | | | | |
| 12 | Lens 6 | 33.802200 (ASP) | 0.641 | Plastic | 1.544 | 55.9 | −1.92 |
| 13 | | 1.008280 (ASP) | 0.700 | | | | |
| 14 | IR-filter | Plano | 0.210 | Glass | 1.517 | 64.2 | — |
| 15 | | Plano | 0.417 | | | | |
| 16 | Image | Plano | — | | | | |

Note:
Reference wavelength (d-line) is 587.6 nm.

TABLE 8

Aspheric Coefficients

| | Surface # | | | | | |
|---|---|---|---|---|---|---|
| | 1 | 2 | 3 | 4 | 6 | 7 |
| k = | −2.75458E+01 | −1.00000E+00 | −9.80898E+00 | −1.00000E+00 | −1.00000E+00 | 3.40892E+01 |
| A4 = | 1.82754E−01 | −3.12646E−02 | −4.73071E−02 | −1.13135E−01 | −1.32644E−01 | −1.33611E−01 |
| A6 = | −1.70924E−01 | 1.79123E−02 | −1.36338E−01 | −1.61135E−01 | −3.24130E−02 | −1.23323E−02 |
| A8 = | 1.66700E−01 | 1.85154E−02 | 3.80691E−01 | 3.30920E−01 | 2.70111E−01 | 9.25946E−02 |
| A10 = | −9.30687E−02 | 1.86333E−01 | −1.24584E+00 | −6.92339E−01 | −6.47992E−01 | −2.02492E−01 |
| A12 = | 4.90855E−02 | −5.62962E−01 | 1.41232E+00 | 4.54029E−01 | 3.50501E−01 | 8.01397E−03 |
| A14 = | −2.39550E−02 | 3.20589E−01 | −6.99005E−01 | −1.16216E−01 | | |

| | Surface # | | | | | |
|---|---|---|---|---|---|---|
| | 8 | 9 | 10 | 11 | 12 | 13 |
| k = | 4.99725E+01 | 1.69625E−01 | 2.58999E−01 | −3.24811E+00 | −1.00000E+00 | −6.54612E+00 |
| A4 = | −6.64159E−02 | −3.16735E−02 | 4.35393E−02 | −1.48087E−01 | −6.60962E−02 | −6.85887E−02 |
| A6 = | 5.93563E−02 | −1.21053E−03 | 2.24380E−03 | 1.53978E−01 | −1.50010E−02 | 2.31571E−02 |
| A8 = | −1.86895E−01 | −1.30948E−02 | −3.33553E−03 | −1.33516E−01 | 8.59726E−03 | −8.02445E−03 |
| A10 = | 2.75521E−01 | −5.41875E−03 | 1.23380E−03 | 7.05530E−02 | −1.21890E−03 | 1.60084E−03 |
| A12 = | −2.22954E−01 | | | −1.42785E−02 | −2.57862E−06 | −1.81849E−04 |
| A14 = | 4.97004E−02 | | | 7.82198E−04 | 4.29108E−05 | 8.93878E−06 |

In the image capturing lens assembly according to the fourth embodiment, the definitions of f, Fno, HFOV, V1, V2, N2, N3, CT5, CT6, R9, R10, R12, f1, f2, f3, f5, Yc, SD, TD, ImgH and TTL are the same as those stated in the first embodiment with corresponding values for the fourth embodiment. Moreover, these parameters can be calculated from Table 7 as the following values and satisfy the following relationships:

| | |
|---|---|
| f (mm) | 3.73 |
| Fno | 2.90 |
| HFOV (deg.) | 36.3 |
| V2 | 55.8 |
| |V1 − V2| | 0.0 |
| (N2 − N3)*10 | −1.04 |
| CT5/CT6 | 0.82 |

-continued

| | |
|---|---|
| (R9 − R10)/(R9 + R10) | 0.30 |
| R12/f | 0.27 |
| (f/f1) + (f/f2) | 1.00 |
| |f/f3| | 0.84 |
| f/f5 | 1.45 |
| Yc/f | 0.37 |
| SD/TD | 0.76 |
| ImgH/f | 0.77 |
| TTL/ImgH | 1.81 |

Figure 9:
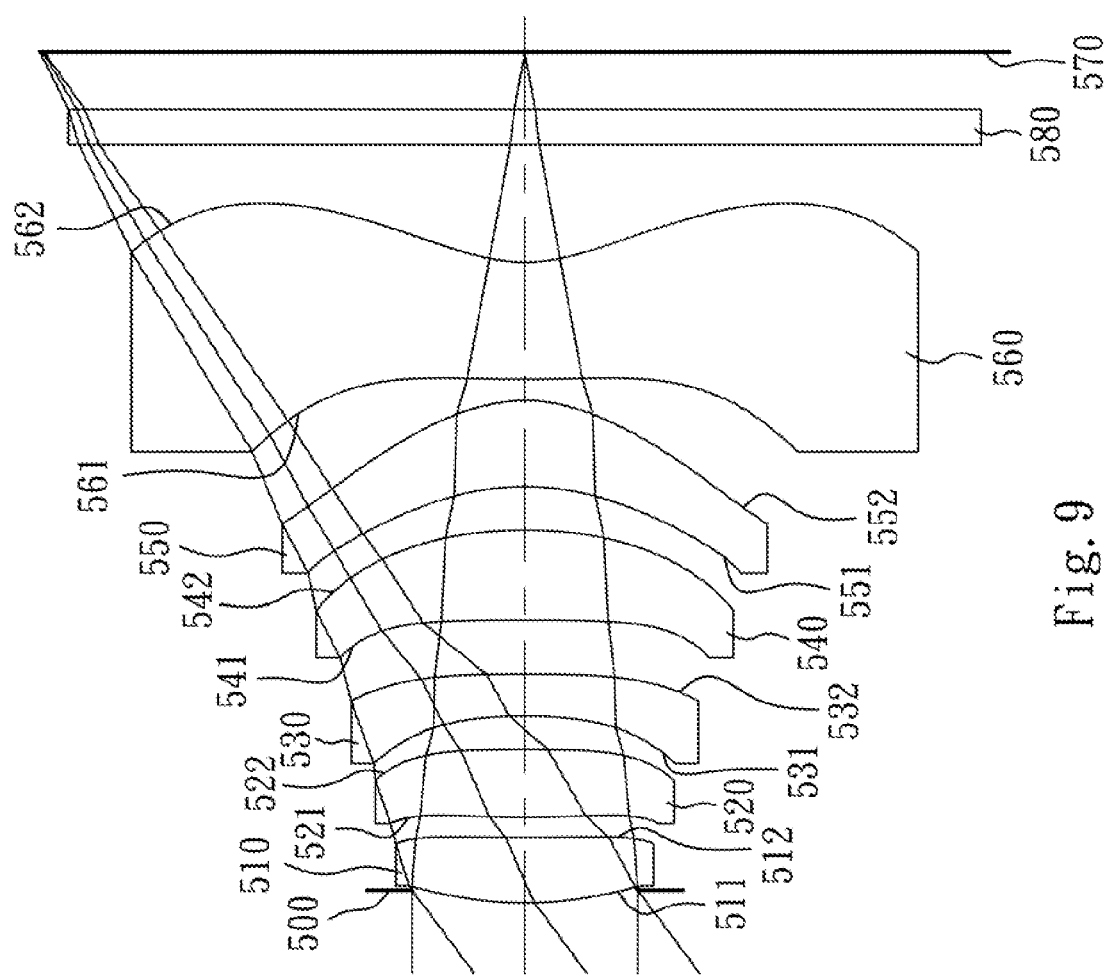
FIG. 9 is a schematic view of an image capturing lens assembly according to the fifth embodiment of the present disclosure.
Figure 10:
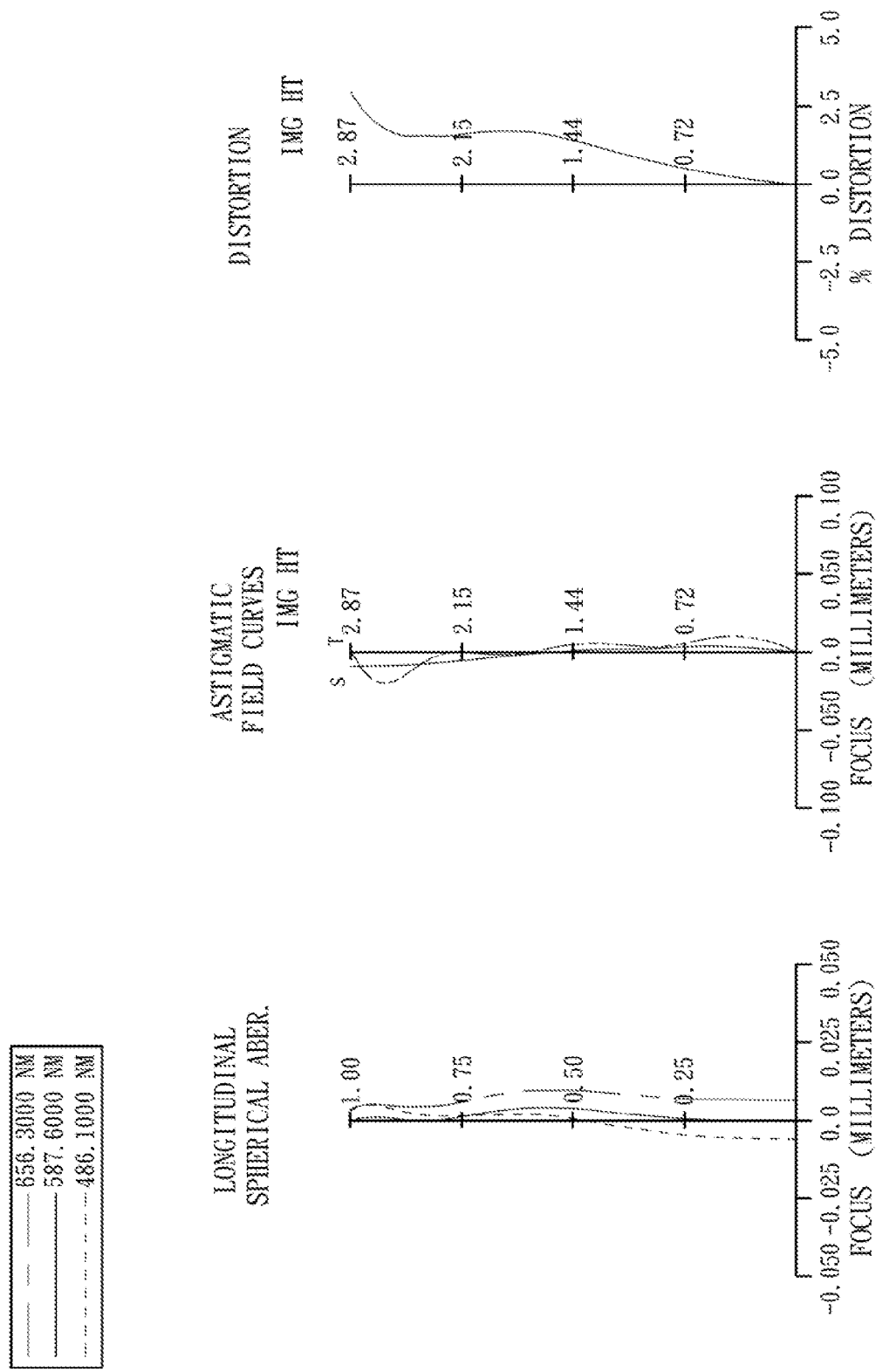
FIG. 10 shows spherical aberration curves, astigmatic field curves and a distortion curve of the image capturing lens assembly according to the fifth embodiment.

FIG. 9 is a schematic view of an image capturing lens assembly according to the fifth embodiment of the present disclosure. FIG. 10 shows spherical aberration curves, astigmatic field curves and a distortion curve of the image capturing lens assembly according to the fifth embodiment. In FIG. 9, the image capturing lens assembly includes, in order from an object side to an image side, an aperture stop 500, the first lens element 510, the second lens element 520, the third lens element 530, the fourth lens element 540, the fifth lens element 550, the sixth lens element 560, an IR cut filter 580 and an image plane 570.

The first lens element 510 is made of plastic material. The first lens element 510 with positive refractive power has a convex object-side surface 511 and a concave image-side surface 512. The object-side surface 511 and the image-side surface 512 of the first lens element 510 are aspheric.

The second lens element 520 is made of plastic material. The second lens element 520 with positive refractive power has a convex object-side surface 521 and a convex image-side surface 522. The object-side surface 521 and the image-side surface 522 of the second lens element 520 are aspheric.

The third lens element 530 is made of plastic material. The third lens element 530 with negative refractive power has a concave object-side surface 531 and a convex image-side surface 532. The object-side surface 531 and the image-side surface 532 of the third lens element 530 are aspheric.

The fourth lens element 540 is made of plastic material. The fourth lens element 540 with positive refractive power has a concave object-side surface 541 and a convex image-side surface 542. The object-side surface 541 and the image-side surface 542 of the fourth lens element 540 are aspheric.

The fifth lens element 550 is made of plastic material. The fifth lens element 550 with positive refractive power has a concave object-side surface 551 and a convex image-side surface 552. The object-side surface 551 and the image-side surface 552 of the fifth lens element 550 are aspheric.

The sixth lens element 560 is made of plastic material. The sixth lens element 560 with negative refractive power has a convex object-side surface 561 and a concave image-side surface 562. The object-side surface 561 and the image-side surface 562 of the sixth lens element 560 are aspheric. The sixth lens element 560 has inflection points formed on the image-side surface 562 thereof.

The IR cut filter 580 is made of glass and located between the sixth lens element 560 and the image plane 570, and will not affect the focal length of the image capturing lens assembly.

The equation of the aspheric surface profiles of the above lens elements of the fifth embodiment is the same as that of the first embodiment, and will not be stated herein again.

The detailed optical data of the fifth embodiment are shown in Table 9 and the aspheric surface data are shown in Table 10 below.

TABLE 9

5th Embodiment
f = 3.76 mm, Fno = 2.80, HFOV = 36.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.075 | | | | |
| 2 | Lens 1 | 2.216850 (ASP) | 0.385 | Plastic | 1.514 | 56.8 | 5.19 |
| 3 | | 12.389800 (ASP) | 0.122 | | | | |
| 4 | Lens 2 | 7.513400 (ASP) | 0.408 | Plastic | 1.530 | 55.8 | 7.96 |
| 5 | | −9.440000 (ASP) | 0.194 | | | | |
| 6 | Lens 3 | −2.825880 (ASP) | 0.250 | Plastic | 1.650 | 21.4 | −5.47 |
| 7 | | −14.285700 (ASP) | 0.326 | | | | |
| 8 | Lens 4 | −28.571400 (ASP) | 0.533 | Plastic | 1.530 | 55.8 | 5.21 |
| 9 | | −2.532710 (ASP) | 0.262 | | | | |
| 10 | Lens 5 | −1.542130 (ASP) | 0.511 | Plastic | 1.530 | 55.8 | 3.29 |
| 11 | | −0.912110 (ASP) | 0.128 | | | | |
| 12 | Lens 6 | 9.090900 (ASP) | 0.696 | Plastic | 1.530 | 55.8 | −2.07 |
| 13 | | 0.954200 (ASP) | 0.700 | | | | |
| 14 | IR-filter | Plano | 0.210 | Glass | 1.517 | 64.2 | — |
| 15 | | Plano | 0.346 | | | | |
| 16 | Image | Plano | — | | | | |

Note:
Reference wavelength (d-line) is 587.6 nm.

TABLE 10

Aspheric Coefficients

| | Surface # | | | | | |
|---|---|---|---|---|---|---|
| | 2 | 3 | 4 | 5 | 6 | 7. |
| k = | −1.62999E+01 | −1.00000E+00 | −4.70638E+01 | −1.00000E+00 | −1.00000E+00 | −4.58506E+01 |
| A4 = | 1.62491E−01 | −8.42048E−02 | −6.74085E−02 | −1.22207E−01 | −1.85514E−01 | −1.12348E−01 |
| A6 = | −2.58895E−01 | −3.89179E−02 | −1.37098E−01 | −1.00055E−01 | −9.79767E−02 | −2.54060E−02 |
| A8 = | 2.69397E−01 | −2.52471E−01 | 2.80050E−01 | 1.17811E−01 | 3.06688E−01 | 8.99941E−02 |
| A10 = | −3.03990E−01 | 3.31579E−01 | −1.17757E+00 | −4.99610E−01 | −5.57522E−01 | −9.23539E−02 |
| A12 = | 4.72164E−02 | −5.62962E−01 | 1.41611E+00 | 4.54599E−01 | 3.50965E−01 | 3.02915E−02 |
| A14 = | −2.85768E−02 | 3.20589E−01 | −6.99005E−01 | −1.14125E−01 | | |

TABLE 10-continued

Aspheric Coefficients

| Surface # | | | | | |
|---|---|---|---|---|---|
| 8 | 9 | 10 | 11 | 12 | 13 |
| k = 5.00000E+01 | 5.68964E−01 | 2.72140E−01 | −3.46339E+00 | −1.00000E+00 | −4.88936E+00 |
| A4 = −7.42420E−02 | −5.32571E−02 | 5.99825E−02 | −1.19054E−01 | −1.01675E−01 | −7.22281E−02 |
| A6 = 3.18552E−02 | 1.24779E−02 | 1.54594E−02 | 1.48164E−01 | −7.04212E−03 | 2.58824E−02 |
| A8 = −2.10855E−01 | −4.62418E−03 | 4.10542E−03 | −1.36467E−01 | 7.96359E−03 | −7.83009E−03 |
| A10 = 2.72627E−01 | −3.36470E−03 | 1.72358E−03 | 6.94448E−02 | −7.37428E−04 | 1.49336E−03 |
| A12 = −1.90919E−01 | | | −1.47392E−02 | 6.82107E−05 | −1.67451E−04 |
| A14 = 4.98427E−02 | | | 6.63481E−04 | −6.46143E−05 | 8.21515E−06 |

In the image capturing lens assembly according to the fifth embodiment, the definitions of f, Fno, HFOV, V1, V2, N2, N3, CT5, CT6, R9, R10, R12, f1, f2, f3, f5, Yc, SD, TD, ImgH and TTL are the same as those stated in the first embodiment with corresponding values for the fifth embodiment. Moreover, these parameters can be calculated from Table 9 as the following values and satisfy the following relationships:

| | |
|---|---|
| f (mm) | 3.76 |
| Fno | 2.80 |
| HFOV (deg.) | 36.5 |
| V2 | 55.8 |
| |V1 − V2| | 1.0 |
| (N2 − N3)*10 | −1.20 |
| CT5/CT6 | 0.73 |
| (R9 − R10)/(R9 + R10) | 0.26 |
| R12/f | 0.25 |
| (f/f1) + (f/f2) | 1.20 |
| |f/f3| | 0.69 |
| f/f5 | 1.14 |
| Yc/f | 0.42 |
| SD/TD | 0.98 |
| ImgH/f | 0.76 |
| TTL/ImgH | 1.74 |

Figure 11:
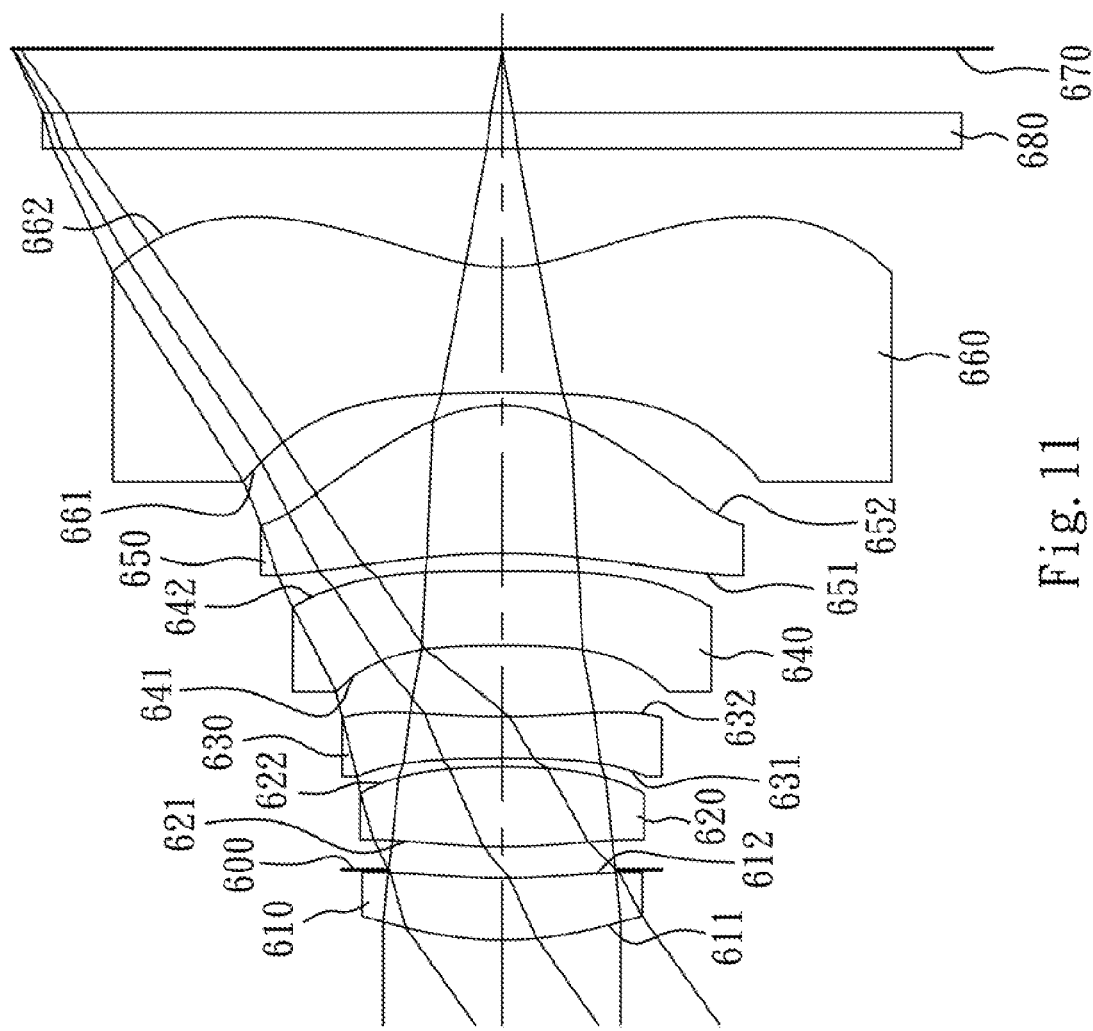
FIG. 11 is a schematic view of an image capturing lens assembly according to the sixth embodiment of the present disclosure.
Figure 12:
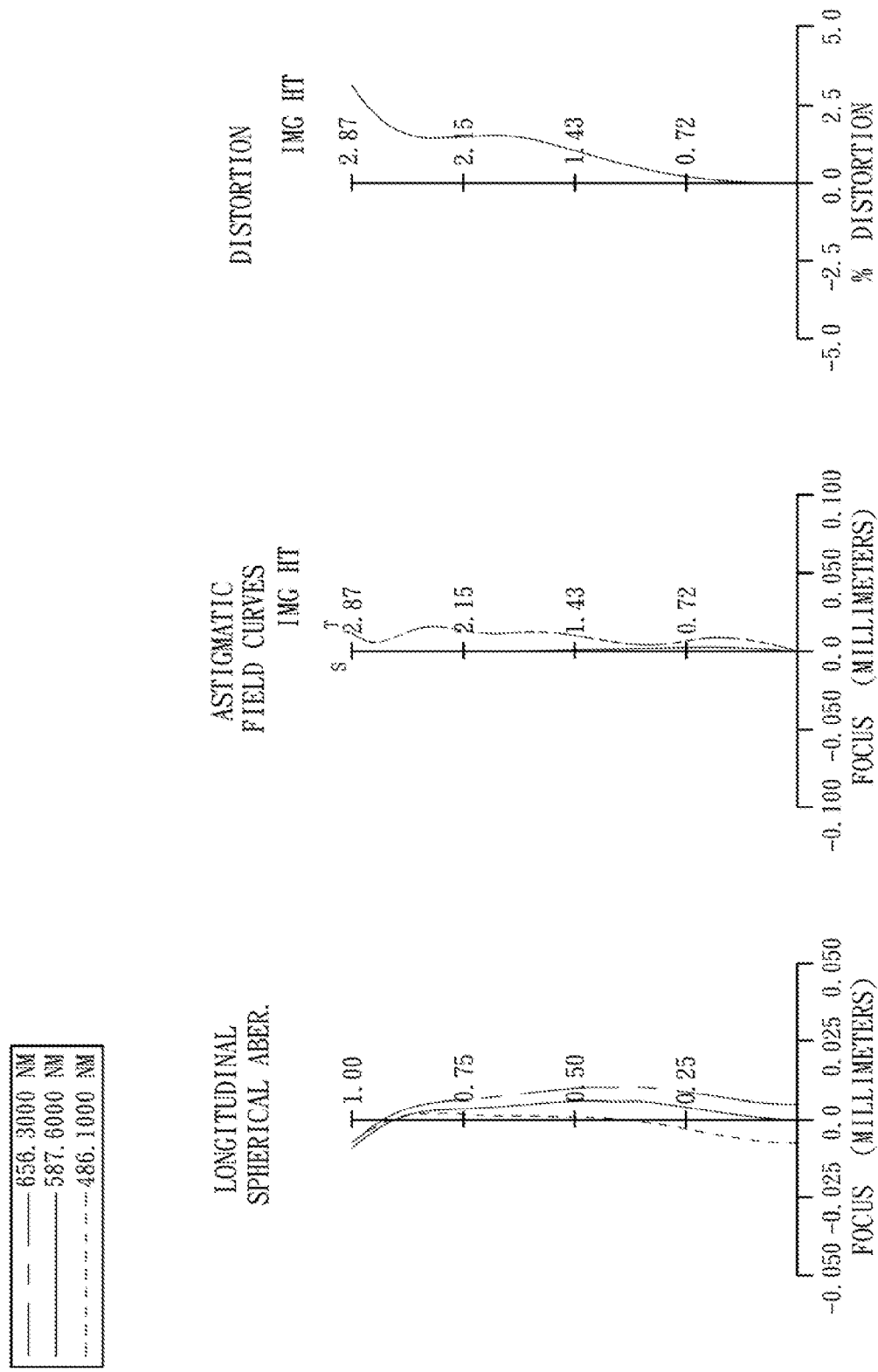
FIG. 12 shows spherical aberration curves, astigmatic field curves and a distortion curve of the image capturing lens assembly according to the sixth embodiment.

FIG. 11 is a schematic view of an image capturing lens assembly according to the sixth embodiment of the present disclosure. FIG. 12 shows spherical aberration curves, astigmatic field curves and a distortion curve of the image capturing lens assembly according to the sixth embodiment. In FIG. 11, the image capturing lens assembly includes, in order from an object side to an image side, the first lens element 610, an aperture stop 600, the second lens element 620, the third lens element 630, the fourth lens element 640, the fifth lens element 650, the sixth lens element 660, an IR cut filter 680 and an image plane 670.

The first lens element 610 is made of plastic material. The first lens element 610 with positive refractive power has a convex object-side surface 611 and a concave image-side surface 612. The object-side surface 611 and the image-side surface 612 of the first lens element 610 are aspheric.

The second lens element 620 is made of plastic material. The second lens element 620 with positive refractive power has a convex object-side surface 621 and a convex image-side surface 622. The object-side surface 621 and the image-side surface 622 of the second lens element 620 are aspheric.

The third lens element 630 is made of plastic material. The third lens element 630 with negative refractive power has a concave object-side surface 631 and a concave image-side surface 632. The object-side surface 631 and the image-side surface 632 of the third lens element 630 are aspheric.

The fourth lens element 640 is made of plastic material. The fourth lens element 640 with negative refractive power has a concave object-side surface 641 and a convex image-side surface 642. The object-side surface 641 and the image-side surface 642 of the fourth lens element 640 are aspheric.

The fifth lens element 650 is made of plastic material. The fifth lens element 650 with positive refractive power has a concave object-side surface 651 and a convex image-side surface 652. The object-side surface 651 and the image-side surface 652 of the fifth lens element 650 are aspheric.

The sixth lens element 660 is made of plastic material. The sixth lens element 660 with negative refractive power has a concave object-side surface 661 and a concave image-side surface 662. The object-side surface 661 and the image-side surface 662 of the sixth lens element 660 are aspheric. The sixth lens element 660 has inflection points formed on the image-side surface 662 thereof.

The IR cut filter 680 is made of glass and located between the sixth lens element 660 and the image plane 670, and will not affect the focal length of the image capturing lens assembly.

The equation of the aspheric surface profiles of the above lens elements of the sixth embodiment is the same as that of the first embodiment, and will not be stated herein again.

The detailed optical data of the sixth embodiment are shown in Table 11 and the aspheric surface data are shown in Table 12 below.

TABLE 11

6th Embodiment
f = 3.90 mm, Fno = 2.80, HFOV = 35.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.132490 (ASP) | 0.364 | Plastic | 1.535 | 56.3 | 7.24 |
| 2 | | 4.465400 (ASP) | 0.052 | | | | |
| 3 | Ape. Stop | Plano | 0.135 | | | | |
| 4 | Lens 2 | 3.865100 (ASP) | 0.465 | Plastic | 1.530 | 55.8 | 3.86 |
| 5 | | −4.167200 (ASP) | 0.050 | | | | |

TABLE 11-continued

6th Embodiment
f = 3.90 mm, Fno = 2.80, HFOV = 35.5 deg.

| Surface # | | Curvature Radius | Thickness | Material | Index | Abbe # | Focal length |
|---|---|---|---|---|---|---|---|
| 6 | Lens 3 | −14.538500 (ASP) | 0.250 | Plastic | 1.614 | 25.6 | −5.51 |
| 7 | | 4.440400 (ASP) | 0.413 | | | | |
| 8 | Lens 4 | −6.649300 (ASP) | 0.441 | Plastic | 1.614 | 25.6 | −14.01 |
| 9 | | −30.003500 (ASP) | 0.100 | | | | |
| 10 | Lens 5 | −4.201800 (ASP) | 0.870 | Plastic | 1.530 | 55.8 | 1.80 |
| 11 | | −0.834360 (ASP) | 0.073 | | | | |
| 12 | Lens 6 | −9.504300 (ASP) | 0.737 | Plastic | 1.530 | 55.8 | −1.65 |
| 13 | | 0.990160 (ASP) | 0.700 | | | | |
| 14 | IR-filter | Plano | 0.210 | Glass | 1.517 | 64.2 | — |
| 15 | | Plano | 0.374 | | | | |
| 16 | Image | Plano | — | | | | |

Note:
Reference wavelength (d-line) is 587.6 nm.

TABLE 12

Aspheric Coefficients

| Surface # | 1 | 2 | 4 | 5 | 6 | 7 |
|---|---|---|---|---|---|---|
| k = | −1.62704E+01 | −1.00000E+00 | −3.22716E+00 | −1.00000E+00 | −1.00000E+00 | −2.16254E+01 |
| A4 = | 1.69850E−01 | −7.66122E−02 | −5.62365E−02 | −1.13301E−01 | −1.62230E−01 | −9.72392E−02 |
| A6 = | −2.44270E−01 | −1.55709E−02 | −1.29026E−01 | −9.15382E−02 | −7.03087E−02 | −2.50975E−02 |
| A8 = | 1.68734E−01 | −1.53159E−01 | 3.88220E−01 | 2.03448E−01 | 3.16268E−01 | 6.61412E−02 |
| A10 = | −7.68490E−02 | 4.22633E−01 | −1.07229E+00 | −4.63888E−01 | −5.39799E−01 | −1.15542E−01 |
| A12 = | 4.61782E−02 | −5.65162E−01 | 1.42087E+00 | 4.54785E−01 | 3.51097E−01 | 5.28599E−02 |
| A14 = | −6.18927E−02 | 3.36529E−01 | −6.82936E−01 | −1.13046E−01 | | |

| Surface # | 8 | 9 | 10 | 11 | 12 | 13 |
|---|---|---|---|---|---|---|
| k = | 4.02433E+01 | 2.56629E+02 | 3.17262E+00 | −3.38873E+00 | −1.00000E+00 | −6.27090E+00 |
| A4 = | −1.64040E−01 | −1.01165E−01 | 2.83770E−02 | −1.42583E−01 | −5.98789E−02 | −6.82870E−02 |
| A6 = | 2.57548E−02 | 1.43165E−02 | 6.24502E−03 | 1.53361E−01 | −1.53526E−02 | 2.53868E−02 |
| A8 = | −2.06456E−01 | −1.78610E−03 | 2.58540E−03 | −1.33674E−01 | 5.10897E−03 | −8.06198E−03 |
| A10 = | 2.78366E−01 | 8.54129E−04 | −2.02839E−03 | 7.03810E−02 | −9.49747E−04 | 1.49041E−03 |
| A12 = | −1.77295E−01 | | | −1.44554E−02 | 2.46254E−04 | −1.54892E−04 |
| A14 = | 5.88389E−02 | | | 6.49403E−04 | −3.10254E−05 | 6.97045E−06 |

In the image capturing Jens assembly according to the sixth embodiment, the definitions of f, Fno, HFOV, V1, V2, N2, N3, CT5, CT6, R9, R10, R12, f1, f2, f3, f5, Yc, SD, TD, ImgH and TTL are the same as those stated in the first embodiment with corresponding values for the sixth embodiment. Moreover, these parameters can be calculated from Table 11 as the following values and satisfy the following relationships:

| f (mm) | 3.90 |
|---|---|
| Fno | 2.80 |
| HFOV (deg.) | 35.5 |
| V2 | 55.8 |
| |V1 − V2| | 0.5 |
| (N2 − N3)*10 | −0.84 |
| CT5/CT6 | 1.18 |
| (R9 − R10)/(R9 + R10) | 0.67 |
| R12/f | 0.25 |
| (f/f1) + (f/f2) | 1.55 |
| |f/f3| | 0.71 |
| f/f5 | 2.16 |
| Yc/f | 0.38 |
| SD/TD | 0.89 |

-continued

| ImgH/f | 0.74 |
|---|---|
| TTL/ImgH | 1.80 |

Figure 13:
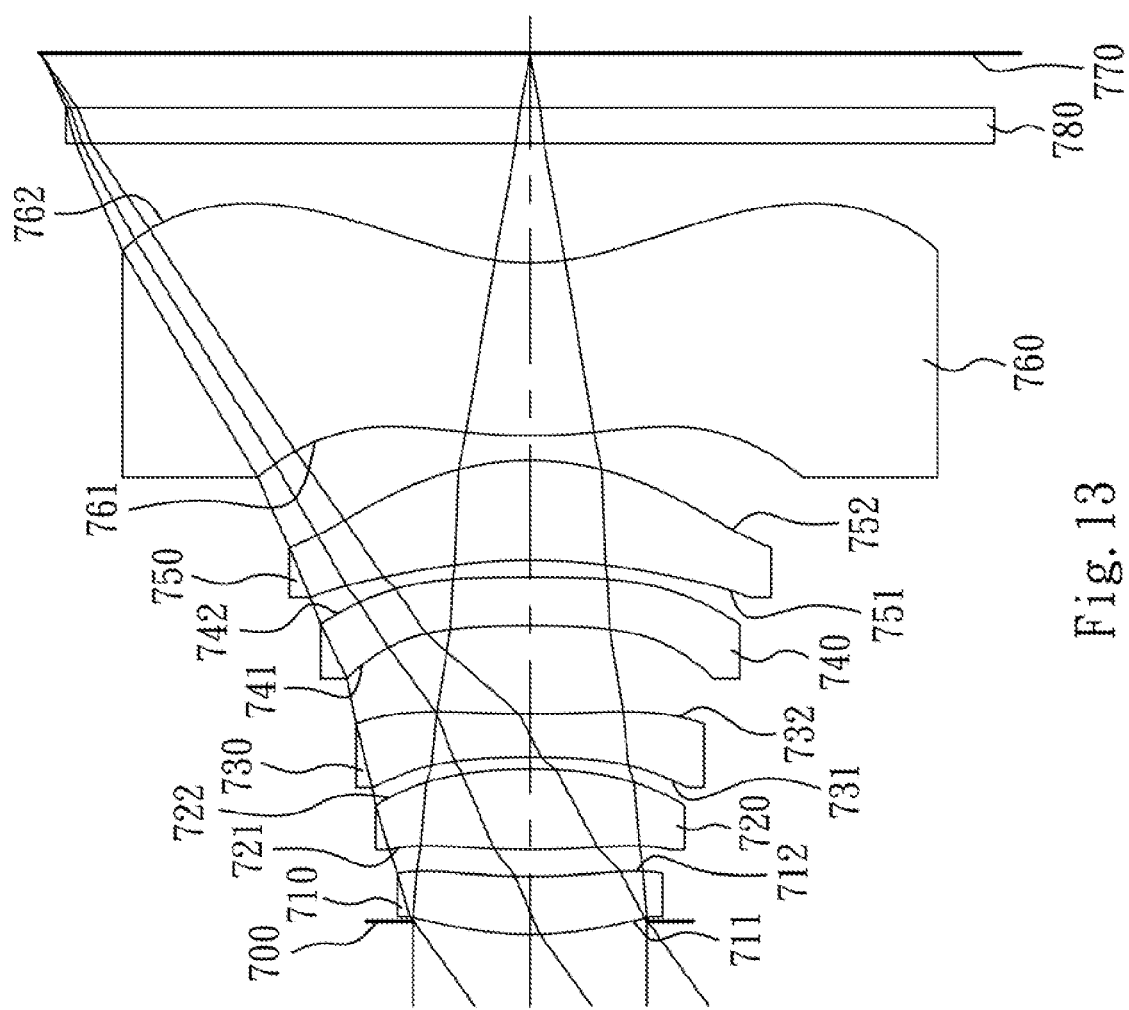
FIG. 13 is a schematic view of an image capturing lens assembly according to the seventh embodiment of the present disclosure.
Figure 14:
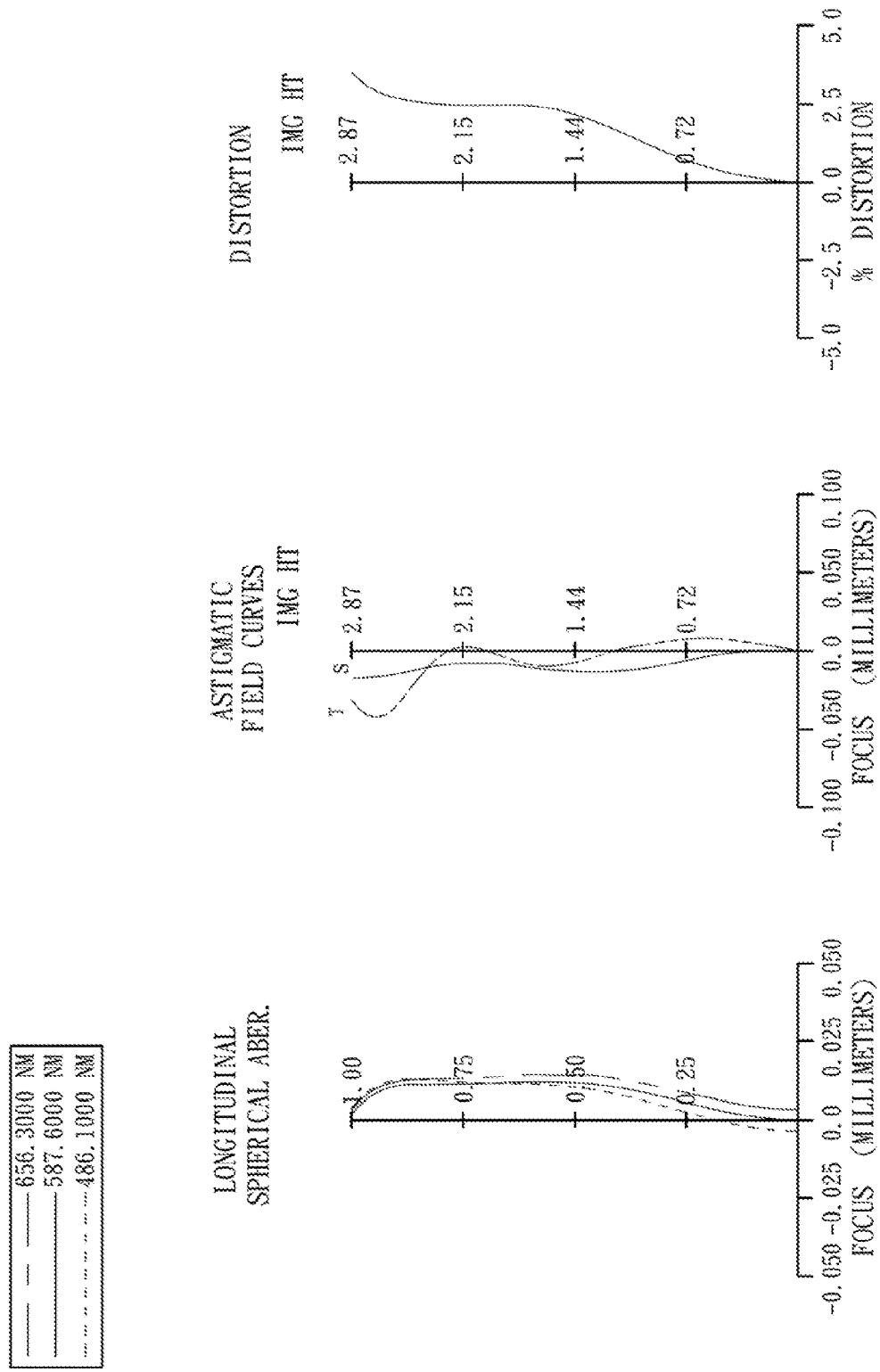
FIG. 14 shows spherical aberration curves, astigmatic field curves and a distortion curve of the image capturing lens assembly according to the seventh embodiment.

FIG. 13 is a schematic view of an image capturing lens assembly according to the seventh embodiment of the present disclosure. FIG. 14 shows spherical aberration curves, astigmatic field curves and a distortion curve of the image capturing lens assembly according to the seventh embodiment. In FIG. 13, the image capturing lens assembly includes, in order from an object side to an image side, an aperture stop 700, the first lens element 710, the second lens element 720, the third lens element 730, the fourth lens element 740, the fifth lens element 750, the sixth lens element 760, an IR cut filter 780 and an image plane 770.

The first lens element 710 is made of plastic material. The first lens element 710 with positive refractive power has a convex object-side surface 711 and a concave image-side surface 712. The object-side surface 711 and the image-side surface 712 of the first lens element 710 are aspheric.

The second lens element 720 is made of plastic material. The second lens element 720 with positive refractive power has a convex object-side surface 721 and a convex image-side surface 722. The object-side surface 721 and the image-side surface 722 of the second lens element 720 are aspheric.

The third lens element 730 is made of plastic material. The third lens element 730 with negative refractive power has a concave object-side surface 731 and a concave image-side surface 732. The object-side surface 731 and the image-side surface 732 of the third lens element 730 are aspheric.

The fourth lens element 740 is made of plastic material. The fourth lens element 740 with negative refractive power has a concave object-side surface 741 and a convex image-side surface 742. The object-side surface 741 and the image-side surface 742 of the fourth lens element 740 are aspheric.

The fifth lens element 750 is made of plastic material. The fifth lens element 750 with positive refractive power has a concave object-side surface 751 and a convex image-side surface 752. The object-side surface 751 and the image-side surface 752 of the fifth lens element 750 are aspheric.

The sixth lens element 760 is made of plastic material. The sixth lens element 760 with negative refractive power has a convex object-side surface 761 and a concave image-side surface 762. The object-side surface 761 and the image-side surface 762 of the sixth lens element 760 are aspheric. The sixth lens element 760 has inflection points formed on the image-side surface 762 thereof.

The IR cut filter 780 is made of glass and located between the sixth lens element 760 and the image plane 770, and will not affect the focal length of the image capturing lens assembly.

The equation of the aspheric surface profiles of the above lens elements of the seventh embodiment is the same as that of the first embodiment, and will not be stated herein again.

The detailed optical data of the seventh embodiment are shown in Table 13 and the aspheric surface data are shown in Table 14 below.

TABLE 13

7th Embodiment
f = 3.83 mm, Fno = 2.80, HFOV = 35.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.080 | | | | |
| 2 | Lens 1 | 2.090550 (ASP) | 0.343 | Plastic | 1.535 | 56.3 | 7.80 |
| 3 | | 3.951800 (ASP) | 0.154 | | | | |
| 4 | Lens 2 | 4.724500 (ASP) | 0.475 | Plastic | 1.530 | 55.8 | 3.50 |
| 5 | | −2.940710 (ASP) | 0.070 | | | | |
| 6 | Lens 3 | −5.252900 (ASP) | 0.250 | Plastic | 1.614 | 25.6 | −4.74 |
| 7 | | 6.663200 (ASP) | 0.521 | | | | |
| 8 | Lens 4 | −7.128400 (ASP) | 0.280 | Plastic | 1.614 | 25.6 | −21.43 |
| 9 | | −15.778600 (ASP) | 0.100 | | | | |
| 10 | Lens 5 | −3.326500 (ASP) | 0.585 | Plastic | 1.530 | 55.8 | 5.34 |
| 11 | | −1.622870 (ASP) | 0.144 | | | | |
| 12 | Lens 6 | 3.016900 (ASP) | 1.013 | Plastic | 1.530 | 55.8 | −6.40 |
| 13 | | 1.411300 (ASP) | 0.700 | | | | |
| 14 | IR-filter | Plano | 0.210 | Glass | 1.517 | 64.2 | — |
| 15 | | Plano | 0.324 | | | | |
| 16 | Image | Plano | — | | | | |

Note:
Reference wavelength (d-line) is 587.6 nm.

TABLE 14

Aspheric Coefficients

| | Surface # | | | | | |
|---|---|---|---|---|---|---|
| | 2 | 3 | 4 | 5 | 6 | 7 |
| k = | −1.51991E+01 | −1.00000E+00 | −2.13745E+01 | −1.00000E+00 | −1.00000E+00 | −2.90546E+01 |
| A4 = | 1.61593E−01 | −1.03770E−01 | −7.01595E−02 | −9.73188E−02 | −1.53933E−01 | −1.03791E−01 |
| A6 = | −2.58555E−01 | −5.78211E−02 | −1.48779E−01 | −7.26591E−02 | −6.04436E−02 | −3.11108E−02 |
| A8 = | 1.94008E−01 | −1.50820E−01 | 3.54536E−01 | 2.16016E−01 | 3.12052E−01 | 7.01845E−02 |
| A10 = | −1.56100E−01 | 3.46337E−01 | −1.06716E+00 | −4.85999E−01 | −5.54006E−01 | −1.12582E−01 |
| A12 = | 4.61783E−02 | −5.65162E−01 | 1.42087E+00 | 4.54785E−01 | 3.57863E−01 | 5.93569E−02 |
| A14 = | −6.18926E−02 | 3.36529E−01 | −6.82936E−01 | −1.13046E−01 | | |

| | Surface # | | | | | |
|---|---|---|---|---|---|---|
| | 8 | 9 | 10 | 11 | 12 | 13 |
| k = | 3.99656E+01 | 1.29067E+02 | 3.96666E+00 | −6.76586E+00 | −1.00000E+00 | −2.45285E+00 |
| A4 = | −1.28534E−01 | −1.35956E−01 | 3.48095E−02 | −1.54873E−01 | −1.27976E−01 | −9.32737E−02 |
| A6 = | 2.36548E−02 | 2.23357E−02 | 4.82142E−03 | 1.55252E−01 | −6.35168E−03 | 3.10108E−02 |
| A8 = | −2.05122E−01 | 1.23163E−03 | 3.64655E−03 | −1.33285E−01 | 8.00466E−03 | −8.36876E−03 |
| A10 = | 2.82044E−01 | 2.58147E−03 | −2.45850E−03 | 6.99563E−02 | 2.30316E−06 | 1.46858E−03 |
| A12 = | −1.76530E−01 | | | −1.47260E−02 | 1.91112E−04 | −1.48833E−04 |
| A14 = | 5.46829E−02 | | | 5.77306E−04 | −1.75106E−04 | 6.27162E−06 |

In the image capturing lens assembly according to the seventh embodiment, the definitions of f, Fno, HFOV, V1, V2, N2, N3, CT5, CT6, R9, R10, R12, f1, f2, f3, f5, Yc, SD, TD, ImgH and TTL are the same as those stated in the first embodiment with corresponding values for the seventh embodiment. Moreover, these parameters can be calculated from Table 13 as the following values and satisfy the following relationships:

| | |
|---|---|
| f (mm) | 3.83 |
| Fno | 2.80 |
| HFOV (deg.) | 35.8 |
| V2 | 55.8 |
| \|V1 − V2\| | 0.5 |
| (N2 − N3)*10 | −0.84 |
| CT5/CT6 | 0.58 |
| (R9 − R10)/(R9 + R10) | 0.34 |
| R12/f | 0.37 |
| (f/f1) + (f/f2) | 1.59 |
| \|f/f3\| | 0.81 |
| f/f5 | 0.72 |
| Yc/f | 0.43 |
| SD/TD | 0.98 |
| ImgH/f | 0.75 |
| TTL/ImgH | 1.78 |

Figure 15:
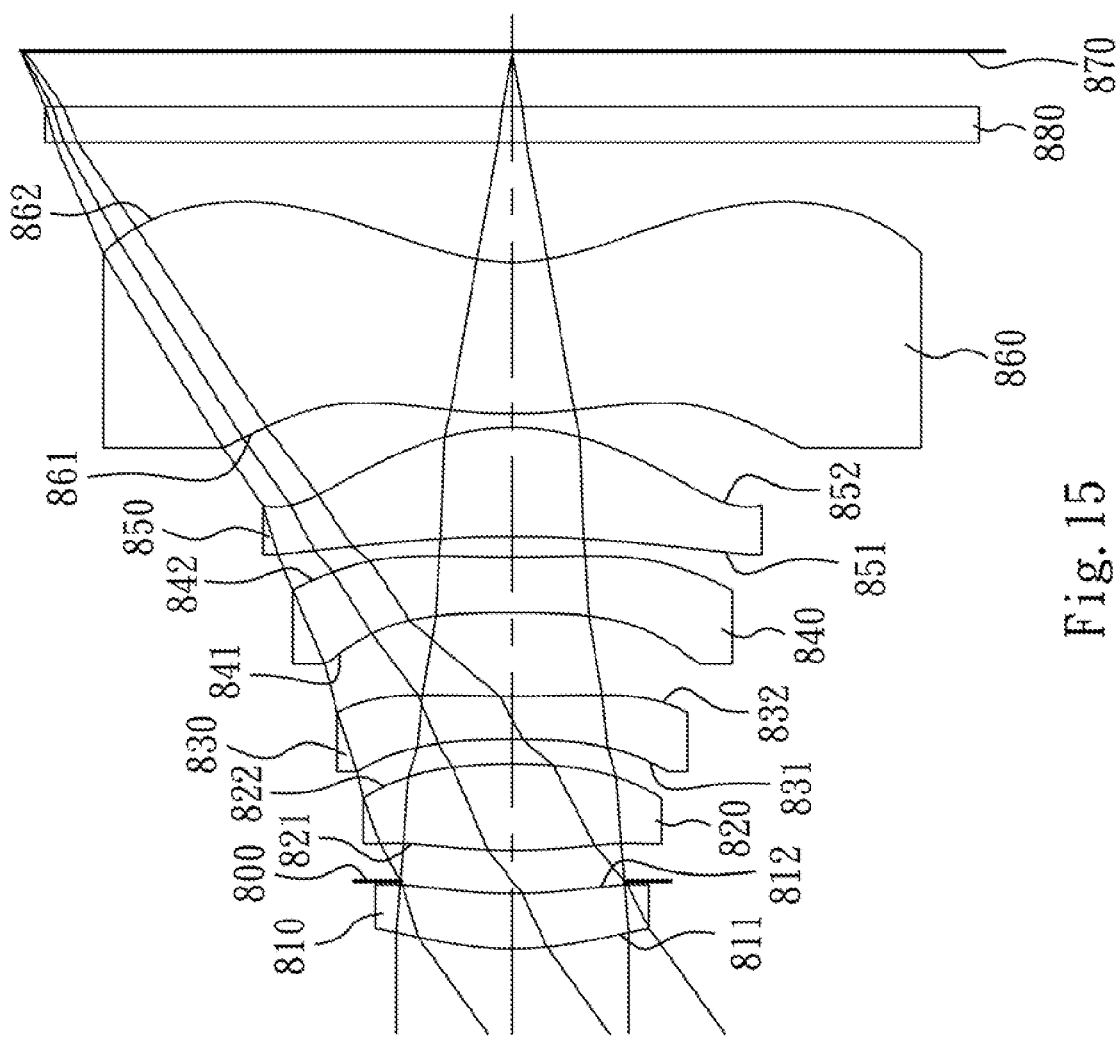
FIG. 15 is a schematic view of an image capturing lens assembly according to the eighth embodiment of the present disclosure.
Figure 16:
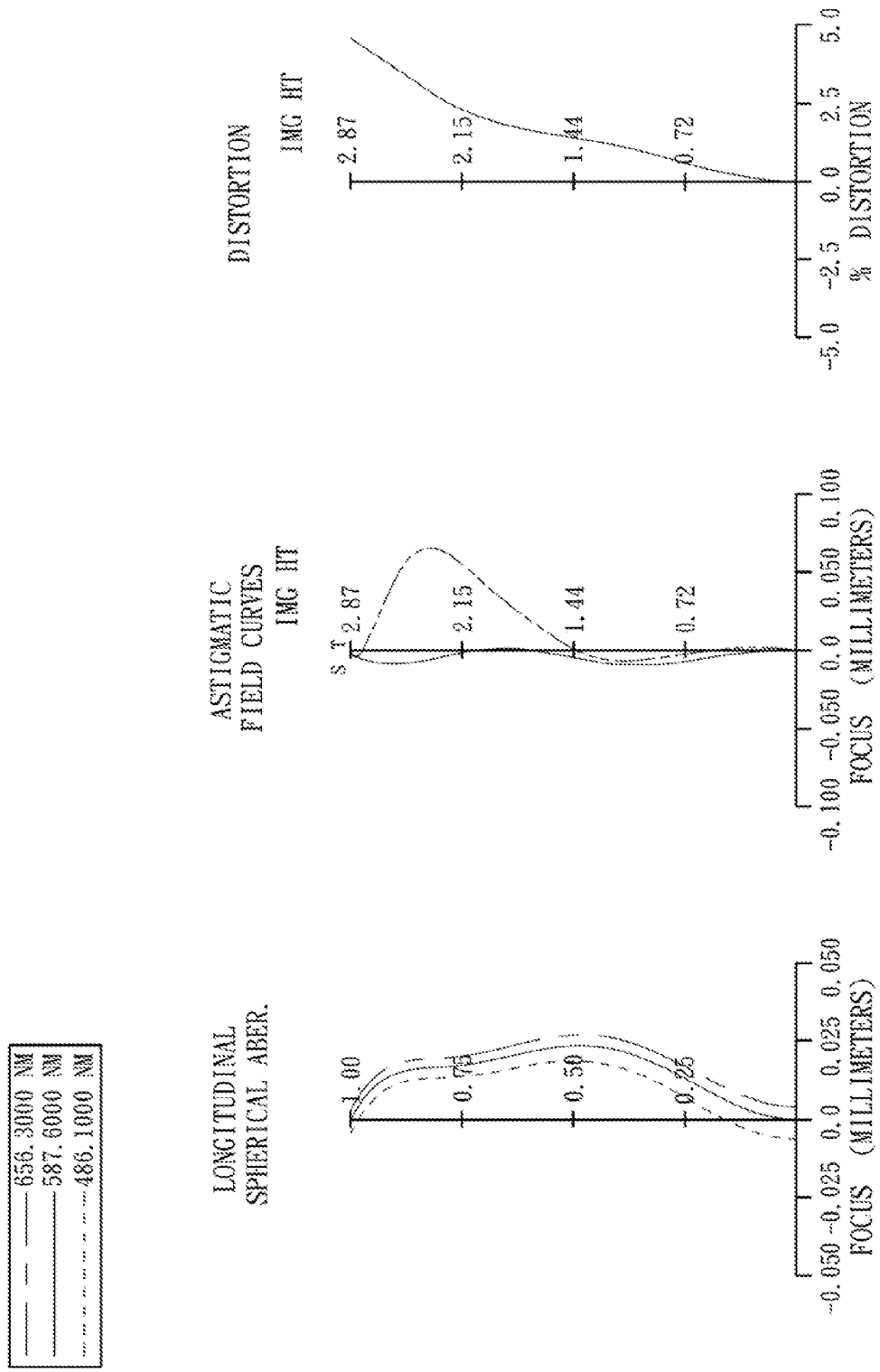
FIG. 16 shows spherical aberration curves, astigmatic field curves and a distortion curve of the image capturing lens assembly according to the eighth embodiment.

FIG. 15 is a schematic view of an image capturing lens assembly according to the eighth embodiment of the present disclosure. FIG. 16 shows spherical aberration curves, astigmatic field curves and a distortion curve of the image capturing lens assembly according to the eighth embodiment. In FIG. 15, the image capturing lens assembly includes, in order from an object side to an image side, the first lens element 810, an aperture stop 800, the second lens element 820, the third lens element 830, the fourth lens element 840, the fifth lens element 850, the sixth lens element 860, an IR cut filter 880 and an image plane 870.

The first lens element 810 is made of plastic material. The first lens element 810 with positive refractive power has a convex object-side surface 811 and a concave image-side surface 812. The object-side surface 811 and the image-side surface 812 of the first lens element 810 are aspheric.

The second lens element 820 is made of plastic material. The second lens element 820 with positive refractive power has a convex object-side surface 821 and a convex image-side surface 822. The object-side surface 821 and the image-side surface 822 of the second lens element 820 are aspheric.

The third lens element 830 is made of plastic material. The third lens element 830 with negative refractive power has a concave object-side surface 831 and a concave image-side surface 832. The object-side surface 831 and the image-side surface 832 of the third lens element 830 are aspheric.

The fourth lens element 840 is made of plastic material. The fourth lens element 840 with negative refractive power has a concave object-side surface 841 and a concave image-side surface 842. The object-side surface 841 and the image-side surface 842 of the fourth lens element 840 are aspheric.

The fifth lens element 850 is made of plastic material. The fifth lens element 850 with positive refractive power has a concave object-side surface 851 and a convex image-side surface 852. The object-side surface 851 and the image-side surface 852 of the fifth lens element 850 are aspheric.

The sixth lens element 860 is made of plastic material. The sixth lens element 860 with negative refractive power has a convex object-side surface 861 and a concave image-side surface 862. The object-side surface 861 and the image-side surface 862 of the sixth lens element 860 are aspheric. The sixth lens element 860 has inflection points formed on the image-side surface 862 thereof.

The IR cut filter 880 is made of glass and located between the sixth lens element 860 and the image plane 870, and will not affect the focal length of the image capturing lens assembly.

The equation of the aspheric surface profiles of the above lens elements of the eighth embodiment is the same as that of the first embodiment, and will not be stated herein again.

The detailed optical data of the eighth embodiment are shown in Table 15 and the aspheric surface data are shown in Table 16 below.

TABLE 15

8th Embodiment
f = 3.80 mm, Fno = 2.80, HFOV = 35.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 2.140130 (ASP) | 0.325 | Plastic | 1.544 | 55.9 | 13.64 |
| 2 | | 2.846220 (ASP) | 0.073 | | | | |
| 3 | Ape. Stop | Plano | 0.176 | | | | |
| 4 | Lens 2 | 3.354200 (ASP) | 0.510 | Plastic | 1.544 | 55.9 | 3.05 |
| 5 | | −3.119200 (ASP) | 0.140 | | | | |
| 6 | Lens 3 | −5.066000 (ASP) | 0.250 | Plastic | 1.583 | 30.2 | −5.45 |
| 7 | | 8.688700 (ASP) | 0.490 | | | | |
| 8 | Lens 4 | −8.174600 (ASP) | 0.325 | Plastic | 1.634 | 23.8 | −6.20 |
| 9 | | 7.692300 (ASP) | 0.120 | | | | |
| 10 | Lens 5 | −6.823500 (ASP) | 0.638 | Plastic | 1.530 | 55.8 | 3.10 |
| 11 | | −1.367350 (ASP) | 0.081 | | | | |
| 12 | Lens 6 | 2.814290 (ASP) | 0.886 | Plastic | 1.544 | 55.9 | −4.61 |
| 13 | | 1.179410 (ASP) | 0.700 | | | | |
| 14 | IR-filter | Plano | 0.210 | Glass | 1.517 | 64.2 | — |
| 15 | | Plano | 0.329 | | | | |
| 16 | Image | Plano | — | | | | |

Note:
Reference wavelength (d-line) is 587.6 nm.

TABLE 16

Aspheric Coefficients

| Surface # | 1 | 2 | 4 | 5 | 6 | 7 |
|---|---|---|---|---|---|---|
| k = | −1.77284E+01 | −1.10348E+00 | −9.55105E+00 | −4.87805E−01 | 2.19297E−01 | −2.25187E+01 |
| A4 = | 1.53377E−01 | −9.96544E−02 | −5.68883E−02 | −1.06794E−01 | −1.52722E−01 | −1.03072E−01 |
| A6 = | −2.66779E−01 | −6.04644E−02 | −1.43334E−01 | −7.71688E−02 | −6.23790E−02 | −3.66512E−02 |
| A8 = | 1.60277E−01 | −1.20108E−01 | 3.48944E−01 | 1.92865E−01 | 3.13692E−01 | 6.14773E−02 |
| A10 = | −7.66802E−02 | 3.62502E−01 | −1.09438E+00 | −4.84390E−01 | −5.86919E−01 | −1.25085E−01 |
| A12 = | 4.67523E−02 | −5.65162E−01 | 1.42113E+00 | 4.53593E−01 | 3.58629E−01 | 6.69047E−02 |
| A14 = | −6.18927E−02 | 3.36529E−01 | −6.82936E−01 | −1.12916E−01 | | |

| Surface # | 8 | 9 | 10 | 11 | 12 | 13 |
|---|---|---|---|---|---|---|
| k = | 5.00000E+01 | −4.99874E+01 | 1.14543E+01 | −4.77098E+00 | 2.72309E−01 | −3.07676E+00 |
| A4 = | −1.38935E−01 | −1.53600E−01 | 9.39852E−03 | −1.38838E−01 | −1.32517E−01 | −9.62083E−02 |
| A6 = | 1.66849E−02 | 2.78532E−02 | −3.04400E−04 | 1.61832E−01 | −4.03474E−03 | 3.31905E−02 |
| A8 = | −1.90029E−01 | −1.71154E−03 | 5.89515E−03 | −1.33120E−01 | 7.31952E−03 | −8.90297E−03 |
| A10 = | 2.91054E−01 | 2.27671E−03 | −2.02116E−03 | 6.99015E−02 | −3.71759E−04 | 1.50536E−03 |
| A12 = | −1.75927E−01 | | | −1.46546E−02 | 1.17701E−04 | −1.39775E−04 |
| A14 = | 4.97893E−02 | | | 6.49483E−04 | −5.79347E−05 | 5.02372E−06 |

In the image capturing lens assembly according to the eighth embodiment, the definitions of f, Fno, HFOV, V1, V2, N2, N3, CT5, CT6, R9, R10, R12, f1, f2, f3, f5, Yc, SD, TD, ImgH and TTL are the same as those stated in the first embodiment with corresponding values for the eighth embodiment. Moreover, these parameters can be calculated from Table 15 as the following values and satisfy the following relationships:

| | |
|---|---|
| f (mm) | 3.80 |
| Fno | 2.80 |
| HFOV (deg.) | 35.8 |
| V2 | 55.9 |
| |V1 − V2| | 0.0 |
| (N2 − N3)*10 | −0.39 |
| CT5/CT6 | 0.72 |
| (R9 − R10)/(R9 + R10) | 0.67 |
| R12/f | 0.31 |
| (f/f1) + (f/f2) | 1.52 |
| |f/f3| | 0.70 |
| f/f5 | 1.22 |
| Yc/f | 0.42 |
| SD/TD | 0.90 |
| ImgH/f | 0.76 |
| TTL/ImgH | 1.81 |

It will be apparent to those skilled in the art that various modifications and variations can be made to the structure of the present invention without departing from the spirit of the invention. In view of the foregoing, it is intended that the present invention cover modifications and variations of this invention provided they fall within the scope of the following claims.

What is claimed is:

1. An image capturing lens assembly comprising, in order from an object side to an image side:
    a first lens element with positive refractive power having a convex object-side surface;
    a second lens element with positive refractive power;
    a third lens element with refractive power;
    a fourth lens element with refractive power;
    a fifth lens element with refractive power having a convex image-side surface; and
    a sixth lens element with refractive power having a concave image-side surface, wherein an object-side surface and the image-side surface of the sixth lens element are aspheric, and the sixth lens element has at least one inflection point formed on the image-side surface thereof;
    wherein a focal length of the image capturing lens assembly is f, and a focal length of the third lens element is f3, the following relationship is satisfied:

$|f/f3|>0.5$.

2. The image capturing lens assembly of claim 1, wherein the sixth lens element has negative refractive power and is made of plastic material.

3. The image capturing lens assembly of claim 2, wherein the fifth lens element has positive refractive power.

4. The image capturing lens assembly of claim 3, wherein a distance between an off-axis point with a tangent line perpendicular to the optical axis on the image-side surface and the optical axis is Yc, and the focal length of the image capturing lens assembly is f, the following relationship is satisfied:

$0.1<Yc/f<0.6$.

5. The image capturing lens assembly of claim 4, wherein the refraction index of the second lens element is N2, the refraction index of the third lens element is N3, the Abbe number of the first lens element is V1, and to the Abbe number of the second lens element is V2, the following relationships are satisfied:

$-2.0<(N2-N3)\times 10<-0.5$; and $|V1-V2|<15$.

6. The image capturing lens assembly of claim 3, further comprises:
    a stop, and the third lens element has negative refractive power, wherein an axial distance between the stop and the image-side surface of the sixth lens element is SD, and an axial distance between the object-side surface of the first lens element and the image-side surface of the sixth lens element is TD, the following relationship is satisfied:

0.7<SD/TD<1.2.

7. The image capturing lens assembly of claim 6, wherein a curvature radius of an object-side surface of the fifth lens element is R9, and a curvature radius of the image-side surface of the fifth lens element is R10, the following relationship is satisfied:

0.1<(R9−R10)/(R9+R10)<0.8.

8. The image capturing lens assembly of claim 6, wherein the third lens element has a concave object-side surface and a concave image-side surface.

9. The image capturing lens assembly of claim 6, further comprising:
an image sensor located on an image plane, wherein a maximum image height of the image capturing lens assembly is ImgH, and the focal length of the image capturing lens assembly is f, the following relationship is satisfied:

ImgH/f>0.72.

10. The image capturing lens assembly of claim 3, wherein the focal length of the image capturing lens assembly is f, a focal length of the first lens element is f1, and a focal length of the second lens element is f2, the following relationship is satisfied:

0.7<(f/f1)+(f/f2)<2.0.

11. The image capturing lens assembly of claim 10, wherein the first lens element has a concave image-side surface, the second lens element has a convex object-side surface and a convex image-side surface, the third lens element has a concave object-side surface and a concave image-side surface, and the fifth lens element has a concave object-side surface.

12. The image capturing lens assembly of claim 10, wherein the focal length of the image capturing lens assembly is f, and a focal length of the fifth lens element is f5, the following relationship is satisfied:

f/f5>0.6.

13. The image capturing lens assembly of claim 12, wherein the image capturing lens assembly has at least four lens elements which are made of plastic material.

14. The image capturing lens assembly of claim 12, wherein a central thickness of the fifth lens element is CT5, and a central thickness of the sixth lens element is CT6, the following relationship is satisfied:

0.3<CT5/CT6<1.0.

15. An image capturing lens assembly comprising, in order from an object side to an image side:
a first lens element with positive refractive power having a convex object-side surface;
a second lens element with positive refractive power;
a third lens element with refractive power;
a fourth lens element with refractive power;
a fifth lens element with refractive power having a convex image-side surface, and made of plastic material; and
a sixth lens element with refractive power having a concave image-side surface, and the sixth lens element made of plastic material, wherein an object-side surface and the image-side surface of the sixth lens element are aspheric, and the sixth lens element has at least one inflection point formed on the image-side surface thereof;

wherein a focal length of the image capturing lens assembly is f, a focal length of the first lens element is f1, a focal length of the second lens element is f2, and the Abbe number of the second lens element is V2, the following relationships are satisfied:

0.3<(f/f1)+(f/f2)<3.5; and

V2>28.

16. The image capturing lens assembly of claim 15, further comprising:
an image sensor located on an image plane, wherein a maximum image height of the image capturing lens assembly is ImgH, an axial distance between the object-side surface of the first lens element and the image plane is TTL, the focal length of the image capturing lens assembly is f, and a distance between an off-axis point with a tangent line perpendicular to the optical axis on the image-side surface and the optical axis is Yc, the following relationships are satisfied:

0.1<Yc/f<0.6; and

TTL/ImgH<2.2.

17. The image capturing lens assembly of claim 15, wherein the third lens element has negative refractive power, the fifth lens element has positive refractive power, and the sixth lens element has negative refractive power.

18. The image capturing lens assembly of claim 17, wherein the third lens element has a concave object-side surface and a concave image-side surface, when a curvature radius of the object-side surface of the fifth lens element is R9, and a curvature radius of the image-side surface of the fifth lens element is R10, the following relationship is satisfied:

0.1<(R9−R10)/(R9+R10)<0.8.

19. The image capturing lens assembly of claim 17, wherein the Abbe number of the first lens element is V1, and the Abbe number of the second lens element is V2, the following relationship is satisfied:

|V−V2|<15.

20. An image capturing lens assembly comprising, in order from an object side to an image side:
a first lens element with positive refractive power having a convex object-side surface;
a second lens element with positive refractive power;
a third lens element with refractive power;
a fourth lens element with refractive power;
a fifth lens element with positive refractive power made of plastic material; and
a sixth lens element with negative refractive power having a concave image-side surface, and made of plastic material, wherein an object-side surface and the image-side surface of the sixth lens element are aspheric, and the sixth lens element has at least one inflection point formed on the image-side surface thereof;
wherein a focal length of the image capturing lens assembly is f, a focal length of the fifth lens element is f5, and the Abbe number of the second lens element is V2, the following relationships are satisfied:

f/f5>0.6; and

V2>28.

21. The image capturing lens assembly of claim 20, wherein the refraction index of the second lens element is N2, and the refraction index of the third lens element is N3, the following relationship is satisfied:

$-2.0 < (N2-N3) \times 10 < -0.5.$

22. The image capturing lens assembly of claim 20, further comprising:
is an image sensor located on an image plane, wherein a maximum image height of the image capturing lens assembly is ImgH, and the focal length of the image capturing lens assembly is f, the following relationship is satisfied:

$ImgH/f > 0.65.$

23. The image capturing lens assembly of claim 22, wherein the focal length of the image capturing lens assembly is f, a focal length of the first lens element is f1, a focal length of the second lens element is f2, and a focal length of the third lens element is f3, the following relationships are satisfied:

$|f/f3| > 0.5;$ and $0.7 < (f/f1) + (f/f2) < 2.0.$

24. The image capturing lens assembly of claim 22, wherein a curvature radius of the image-side surface of the sixth lens element is R12, and the focal length of the image capturing lens assembly is f, the following relationship is satisfied:

$0.2 < R12/f < 0.4.$

* * * * *

UNITED STATES PATENT AND TRADEMARK OFFICE
CERTIFICATE OF CORRECTION

PATENT NO. : 8,477,431 C1
APPLICATION NO. : 90/013172
DATED : March 5, 2015
INVENTOR(S) : Hsin-Hsuan Huang Page 1 of 2

It is certified that error appears in the above-identified patent and that said Letters Patent is hereby corrected as shown below:

In the Claims

In Column 10, Claim 142, Line 1, delete "image capturing lens assembly" and insert -- portable electronic product --, therefor.

In Column 10, Claim 143, Line 1, delete "image capturing lens assembly" and insert -- portable electronic product --, therefor.

In Column 10, Claim 144, Line 1, delete "image capturing lens assembly" and insert -- portable electronic product --, therefor.

In Column 10, Claim 145, Line 1, delete "image capturing lens assembly" and insert -- portable electronic product --, therefor.

In Column 10, Claim 146, Line 1, delete "image capturing lens assembly" and insert -- portable electronic product --, therefor.

In Column 10, Claim 147, Line 1, delete "image capturing lens assembly" and insert -- portable electronic product --, therefor.

In Column 11, Claim 148, Line 1, delete "image capturing lens assembly" and insert -- portable electronic product --, therefor.

In Column 11, Claim 150, Line 1, delete "image capturing lens assembly" and insert -- portable electronic product --, therefor.

In Column 12, Claim 151, Line 1, delete "image capturing lens assembly" and insert -- portable electronic product --, therefor.

Signed and Sealed this
Sixteenth Day of June, 2015

Michelle K. Lee
*Director of the United States Patent and Trademark Office*

CERTIFICATE OF CORRECTION (continued)
U.S. Pat. No. 8,477,431 C1

In Column 12, Claim 152, Line 1, delete "image capturing lens assembly" and insert -- portable electronic product --, therefor.

In Column 12, Claim 153, Line 1, delete "image capturing lens assembly" and insert -- portable electronic product --, therefor.

In Column 12, Claim 154, Line 1, delete "image capturing lens assembly" and insert -- portable electronic product --, therefor.

In Column 12, Claim 155, Line 1, delete "image capturing lens assembly" and insert -- portable electronic product --, therefor.

UNITED STATES PATENT AND TRADEMARK OFFICE
CERTIFICATE OF CORRECTION

PATENT NO. : 8,477,431 B2
APPLICATION NO. : 13/293127
DATED : July 2, 2013
INVENTOR(S) : Hsin-Hsuan Huang It is certified that error appears in the above-identified patent and that said Letters Patent is hereby corrected as shown below:

In the Claims

In Column 30, Line 59, in Claim 5 please delete "$|V|-V2|<15$." and insert --$|V1-V2| < 15$.-- therefor.

In Column 32, Line 42, in Claim 19 please delete "$|V-V2|<15$." and insert --$|V1-V2| < 15$.-- therefor.

Signed and Sealed this
Twenty-first Day of July, 2015

Michelle K. Lee
*Director of the United States Patent and Trademark Office*

(12) EX PARTE REEXAMINATION CERTIFICATE (10523rd)

United States Patent
Huang

(10) Number: US 8,477,431 C1
(45) Certificate Issued: Mar. 5, 2015

(54) IMAGE CAPTURING LENS ASSEMBLY

(75) Inventor: Hsin-Hsuan Huang, Taichung (TW)

(73) Assignee: Largan Precision Co., Ltd., Nantun Dist., Taichung (TW)

Reexamination Request:
No. 90/013,172, Mar. 6, 2014

Reexamination Certificate for:
Patent No.: 8,477,431
Issued: Jul. 2, 2013
Appl. No.: 13/293,127
Filed: Nov. 10, 2011

(30) Foreign Application Priority Data

Jun. 10, 2011 (TW) .............................. 100120399 A

(51) Int. Cl.
*G02B 13/18* (2006.01)
(52) U.S. Cl.
USPC .......................................... 359/713; 359/759
(58) Field of Classification Search
None
See application file for complete search history.

(56) References Cited

To view the complete listing of prior art documents cited during the proceeding for Reexamination Control Number 90/013,172, please refer to the USPTO's public Patent Application Information Retrieval (PAIR) system under the Display References tab.

*Primary Examiner* — Linh M Nguyen

(57) ABSTRACT

An image capturing lens assembly includes, in order from an object side to an image side, a first lens element with positive refractive power having a convex object-side surface, a second lens element with positive refractive power, a third lens element with refractive power, a fourth lens element with refractive power, a fifth lens element with refractive power having a convex image-side surface, and a sixth lens element with refractive power having a concave image-side surface. An object-side surface and the image-side surface of the sixth lens element are aspheric, and the sixth lens element has at least one inflection point formed on the image-side surface thereof.

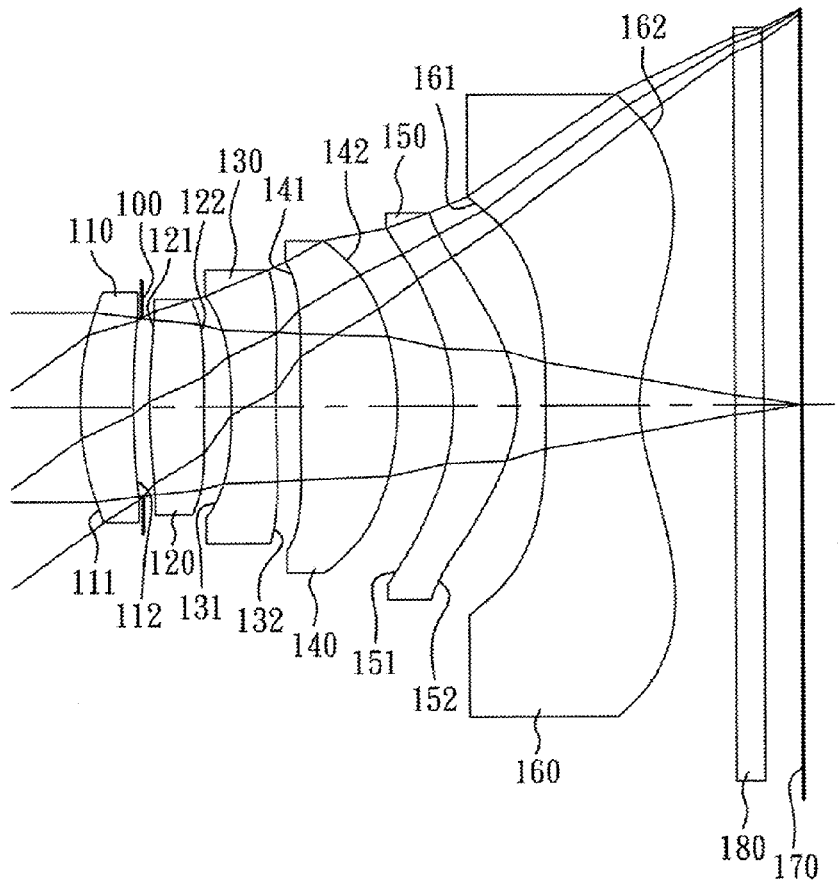

US 8,477,431 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 15 and 16 is confirmed.

New claims 25-155 are added and determined to be patentable.

Claims 3-14 and 17-24 were not reexamined.

*25. An image capturing lens assembly comprising, in order from an object side to an image side of the image capturing lens assembly:*
  *a first lens element with a positive refractive power and including a convex object-side surface;*
  *a second lens element with a positive refractive power;*
  *a third lens element with a refractive power;*
  *a fourth lens element with a refractive power;*
  *a fifth lens element with a refractive power and including a convex image-side surface; and*
  *a sixth lens element with a refractive power and including a concave image-side surface, wherein an object-side surface and the image-side surface of the sixth lens element are aspheric, and the sixth lens element has at least one inflection point formed on the image-side surface;*
  *wherein the image capturing lens assembly is structured to form an image at an image plane on the image side and to render a maximum image height ImgH of an image at the image plane, a focal length f of the image capturing lens assembly, and a focal length f3 of the third lens element to satisfy:*

*$|f/f3|>0.5;$*

*and*

*$ImgH/f>0.65.$*

*26. The image capturing lens assembly of claim 25, wherein the sixth lens element has a negative refractive power and includes a plastic material.*

*27. The image capturing lens assembly of claim 25, wherein the third lens element has a negative refractive power.*

*28. The image capturing lens assembly of claim 25, wherein the fourth lens element has a positive refractive power.*

*29. The image capturing lens assembly of claim 25, wherein the fourth lens element has a negative refractive power.*

*30. The image capturing lens assembly of claim 25, wherein the first lens element includes a concave image-side surface.*

*31. The image capturing lens assembly of claim 25, wherein the first lens element includes a convex image-side surface.*

*32. The image capturing lens assembly of claim 25, wherein the second lens element includes a convex object-side surface.*

*33. The image capturing lens assembly of claim 25, wherein the second lens element includes a concave object-side surface.*

*34. The image capturing lens assembly of claim 25, wherein the second lens element includes a convex image-side surface.*

*35. The image capturing lens assembly of claim 25, wherein the second lens element includes a concave image-side surface.*

*36. The image capturing lens assembly of claim 25, wherein the third lens element includes a concave object-side surface.*

*37. The image capturing lens assembly of claim 25, wherein the third lens element includes a concave image-side surface.*

*38. The image capturing lens assembly of claim 25, wherein the third lens element includes a convex image-side surface.*

*39. The image capturing lens assembly of claim 25, wherein the fourth lens element includes a convex object-side surface.*

*40. The image capturing lens assembly of claim 25, wherein the fourth lens element includes a concave object-side surface.*

*41. The image capturing lens assembly of claim 25, wherein the fourth lens element includes a convex image-side surface.*

*42. The image capturing lens assembly of claim 25, wherein the fourth lens element includes a concave image-side surface.*

*43. The image capturing lens assembly of claim 25, wherein the fifth lens element includes a concave object-side surface.*

*44. The image capturing lens assembly of claim 25, wherein the sixth lens element includes a concave object-side surface.*

*45. The image capturing lens assembly of claim 25, wherein the sixth lens element includes a convex object-side surface.*

*46. The image capturing lens assembly of claim 25, wherein the image capturing lens assembly includes at least four lens elements which include plastic materials.*

*47. The image capturing lens assembly of claim 25, further comprising:*
  *a stop located and structured to control light passing through the image capturing lens assembly,*
  *wherein the third lens element has a negative refractive power,*
  *wherein an axial distance SD between the stop and the image-side surface of the sixth lens element, and an axial distance TD between the object-side surface of the first lens element and the image-side surface of the sixth lens element satisfy:*

*$0/7<SD/TD<1.2.$*

*48. The image capturing lens assembly of claim 25, wherein a distance Yc between an off-axis point with a tangent line perpendicular to the optical axis on the image-side surface of the sixth lens and the optical axis, and the focal length f of the image capturing lens assembly satisfy:*

*$0.1<Yc/f<0.6.$*

*49. The image capturing lens assembly of claim 25, wherein a refractive index N2 of the second lens element, a* refractive index N3 of the third lens element, an Abbe number V1 of the first lens element, and an Abbe number V2 of the second lens element satisfy:

$-31\ 2.0<(N2-N3)\times 10<-0.5$ and $|V1-V2|<15.$

50. The image capturing lens assembly of claim 25, wherein a central thickness CT5 of the fifth lens element and a central thickness CT6 of the sixth lens element satisfy:

$0.3<CT5/CT6<1.0.$

51. The image capturing lens assembly of claim 25, wherein a central thickness CT5 of the fifth lens element and a central thickness CT6 of the sixth lens element satisfy:

$0.58 \leq CT5/CT6<1.0.$

52. The image capturing lens assembly of claim 25, wherein the maximum image height ImgH and an axial distance TTL between the object-side surface of the first lens element and the image plane satisfy:

$TTL/ImgH <2.2.$

53. The image capturing lens assembly of claim 25, wherein the maximum image height ImgH and an axial distance TTL between the object-side surface of the first lens element and the image plane satisfy:

$TTL/ImgH \leq 1.81.$

54. An image capturing lens assembly comprising, in order from an object side to an image side of the image capturing lens assembly:
   a first lens element with a positive refractive power and including a convex object-side surface;
   a second lens element with a positive refractive power;
   a third lens element with a refractive power;
   a fourth lens element with a refractive power;
   a fifth lens element with a refractive power and including a convex image-side surface; and
   a sixth lens element with a refractive power and including a concave image-side surface, wherein an object-side surface and the image-side surface of the sixth lens element are aspheric, and the sixth lens element has at least one inflection point formed on the image-side surface;
   wherein a focal length f of the image capturing lens assembly, a focal length f3 of the third lens element, and a curvature radius R12 of the image-side surface of the sixth lens element satisfy:

$|f/f3|>0.5;$ and $0.2<R12/f<0.4.$

55. The image capturing lens assembly of claim 54, wherein the sixth lens element has a negative refractive power and includes a plastic material.

56. The image capturing lens assembly of claim 54, wherein the third lens element has a negative refractive power.

57. The image capturing lens assembly of claim 54, wherein the fourth lens element has a positive refractive power.

58. The image capturing lens assembly of claim 54, wherein the fourth lens element has a negative refractive power.

59. The image capturing lens assembly of claim 54, wherein the first lens element includes a concave image-side surface.

60. The image capturing lens assembly of claim 54, wherein the first lens element includes a convex image-side surface.

61. The image capturing lens assembly of claim 54, wherein the second lens element includes a convex object-side surface.

62. The image capturing lens assembly of claim 54, wherein the second lens element includes a concave object-side surface.

63. The image capturing lens assembly of claim 54, wherein the second lens element includes a convex image-side surface.

64. The image capturing lens assembly of claim 54, wherein the second lens element includes a concave image-side surface.

65. The image capturing lens assembly of claim 54, wherein the third lens element includes a concave object-side surface.

66. The image capturing lens assembly of claim 54, wherein the third lens element includes a concave image-side surface.

67. The image capturing lens assembly of claim 54, wherein the third lens element includes a convex image-side surface.

68. The image capturing lens assembly of claim 54, wherein the fourth lens element includes a convex object-side surface.

69. The image capturing lens assembly of claim 54, wherein the fourth lens element includes a concave object-side surface.

70. The image capturing lens assembly of claim 54, wherein the fourth lens element includes a convex image-side surface.

71. The image capturing lens assembly of claim 54, wherein the fourth lens element includes a concave image-side surface.

72. The image capturing lens assembly of claim 54, wherein the fifth lens element includes a concave object-side surface.

73. The image capturing lens assembly of claim 54, wherein the sixth lens element includes a concave object-side surface.

74. The image capturing lens assembly of claim 54, wherein the sixth lens element includes a convex object-side surface.

75. The image capturing lens assembly of claim 54, wherein the image capturing lens assembly has at least four lens elements which include plastic materials.

76. The image capturing lens assembly of claim 54, further comprising:
   a stop located in the image capturing lens assembly,
   wherein the third lens element has a negative refractive power, and
   wherein an axial distance SD between the stop and the image-side surface of the sixth lens element and an axial distance TD between the object-side surface of the first lens element and the image-side surface of the sixth lens element satisfy:

$0.7<SD/TD<1.2.$

77. The image capturing lens assembly of claim 54, wherein a distance Yc between an off-axis point with a tangent line perpendicular to the optical axis on the image-side surface of the sixth lens and the optical axis, and the focal length f of the image capturing lens assembly satisfy:

$$0.1 < Yc/f < 0.6.$$

78. The image capturing lens assembly of claim 54, wherein a refractive index N2 of the second lens element, the refractive index N3 of the third lens element, an Abbe number V1 of the first lens element, and an Abbe number V2 of the second lens element satisfy:

$$-2.0 < (N2-N3) \times 10 < -0.5;$$

and $$|V1-V2| < 15.$$

79. The image capturing lens assembly of claim 54, wherein a central thickness CT5 of the fifth lens element and a central thickness CT6 of the sixth lens element satisfy:

$$0.3 < CT5/CT6 < 1.0.$$

80. The image capturing lens assembly of claim 54, wherein a central thickness CT5 of the fifth lens element and a central thickness CT6 of the sixth lens satisfy:

$$0.58 \le CT5/CT6 < 1.0.$$

81. The image capturing lens assembly of claim 54, further comprising:
an image sensor located to capture an image formed at an image plane by the image capturing lens assembly, and wherein a maximum image height ImgH of the image at the image plane and an axial distance TTL between the object-side surface of the first lens element and the image plane satisfy:

$$TTL/ImgH < 2.2.$$

82. The image capturing lens assembly of claim 54, further comprising:
an image sensor located to capture an image formed at an image plane by the image capturing lens assembly, and wherein a maximum image height ImgH of the image at the image plane and an axial distance TTL between the object-side surface of the first lens element and the image plane satisfy:

$$TTL/ImgH \le 1.81.$$

83. An image capturing lens assembly comprising, in order from an object side to an image side of the image capturing lens assembly:
a first lens element with a positive refractive power and including a convex object-side surface;
a second lens element with a positive refractive power;
a third lens element with a refractive power;
a fourth lens element with a refractive power;
a fifth lens element including a plastic material, structured to have a refractive power and including a convex image-side surface; and
a sixth lens element that includes a plastic material, is structured to include a concave image-side surface and an object-side surface that are aspheric, and includes at least one inflection point formed on the image-side surface;
wherein a maximum image height ImgH of an image formed at an image plane by the image capturing lens assembly, a focal length f of the image capturing lens assembly, a focal length f1 of the first lens element, a focal length f2 of the second lens element, and an Abbe number V2 of the second lens element satisfy:

$$0.3 < (f/f1) + (f/f2) < 3.5;$$

$$V2 > 28;$$

and $$ImgH/f > 0.65.$$

84. The image capturing lens assembly of claim 83, wherein the sixth lens element has a negative refractive power.
85. The image capturing lens assembly of claim 83, wherein the third lens element has a negative refractive power.
86. The image capturing lens assembly of claim 83, wherein the fourth lens element has a positive refractive power.
87. The image capturing lens assembly of claim 83, wherein the fourth lens element has a negative refractive power.
88. The image capturing lens assembly of claim 83, wherein the first lens element includes a concave image-side surface.
89. The image capturing lens assembly of claim 83, wherein the first lens element includes a convex image-side surface.
90. The image capturing lens assembly of claim 83, wherein the second lens element includes a convex object-side surface.
91. The image capturing lens assembly of claim 83, wherein the second lens element includes a concave object-side surface.
92. The image capturing lens assembly of claim 83, wherein the second lens element includes a convex image-side surface.
93. The image capturing lens assembly of claim 83, wherein the second lens element includes a concave image-side surface.
94. The image capturing lens assembly of claim 83, wherein the third lens element includes a concave object-side surface.
95. The image capturing lens assembly of claim 83, wherein the third lens element includes a concave image-side surface.
96. The image capturing lens assembly of claim 83, wherein the third lens element includes a convex image-side surface.
97. The image capturing lens assembly of claim 83, wherein the fourth lens element includes a convex object-side surface.
98. The image capturing lens assembly of claim 83, wherein the fourth lens element includes a concave object-side surface.
99. The image capturing lens assembly of claim 83, wherein the fourth lens element includes a convex image-side surface.
100. The image capturing lens assembly of claim 83, wherein the fourth lens element includes a concave image-side surface.
101. The image capturing lens assembly of claim 83, wherein the fifth lens element includes a concave object-side surface.
102. The image capturing lens assembly of claim 83, wherein the sixth lens element includes a concave object-side surface.

103. The image capturing lens assembly of claim 83, wherein the sixth lens element includes a convex object-side surface.

104. The image capturing lens assembly of claim 83, wherein the image capturing lens assembly includes at least four lens elements which include plastic materials.

105. The image capturing lens assembly of claim 83, further comprising:
a stop located in an optical path of the image capturing lens assembly,
wherein the third lens element has a negative refractive power, and
wherein an axial distance SD between the stop and the image-side surface of the sixth lens element is, and an axial distance TD between the object-side surface of the first lens element and the image-side surface of the sixth lens element satisfy:

$0.7 < SD/TD < 1.2.$

106. The image capturing lens assembly of claim 83, wherein a distance Yc between an off-axis point with a tangent line perpendicular to the optical axis on the image-side surface of the sixth lens and the optical axis, and the focal length f of the image capturing lens assembly satisfy:

$0.1 < Yc/f < 0.6.$

107. The image capturing lens assembly of claim 83, wherein a refraction index N2 of the second lens element, a refractive index N3 of the third lens element, an Abbe number V1 of the first lens element, and an Abbe number V2 of the second lens element satisfy:

$-2.0 < (N2-N3) \times 10 < -0.5;$ and $|V1-V2| < 15.$

108. The image capturing lens assembly of claim 83, wherein a central thickness CT5 of the fifth lens element and a central thickness CT6 of the sixth lens element satisfy:

$0.3 < CT5/CT6 < 1.0.$

109. The image capturing lens assembly of claim 83, wherein a central thickness CT5 of the fifth lens element and a central thickness CT6 of the sixth lens element satisfy:

$0.58 \leq CT5/CT6 < 1.0.$

110. The image capturing lens assembly of claim 83, wherein the maximum image height ImgH and an axial distance TTL between the object-side surface of the first lens element and the image plane satisfy:

$TTL/ImgH < 2.2.$

111. The image capturing lens assembly of claim 83, wherein the maximum image height ImgH and an axial distance TTL between the object-side surface of the first lens element and the image plane satisfy:

$TTL/ImgH \leq 1.81.$

112. An image capturing lens assembly comprising, in order from an object side to an image side of the image capturing lens assembly:
a first lens element with a positive refractive power and including a convex object-side surface;
a second lens element with a positive refractive power;
a third lens element with a refractive power;
a fourth lens element with a refractive power;
a fifth lens element with a refractive power and including a convex image-side surface, and including a plastic material; and
a sixth lens element with a refractive power, structured to include a concave image-side surface and a plastic material, wherein an object-side surface and the image-side surface of the sixth lens element are aspheric, and the sixth lens element has at least one inflection point formed on the image-side surface;
wherein a focal length f of the image capturing lens assembly, a focal length f1 of the first lens element, a focal length f2 of the second lens element, an Abbe number V2 of the second lens element, and a curvature radius R12 of the image-side surface of the sixth lens element satisfy:

$0.3 < (f/f1) + (f/f2) < 3.5;$ $V2 > 28;$ and $0.2 < R12/f < 0.4.$

113. The image capturing lens assembly of claim 112, wherein the sixth lens element has a negative refractive power.

114. The image capturing lens assembly of claim 112, wherein the third lens element has a negative refractive power.

115. The image capturing lens assembly of claim 112, wherein the fourth lens element has a positive refractive power.

116. The image capturing lens assembly of claim 112, wherein the fourth lens element has a negative refractive power.

117. The image capturing lens assembly of claim 112, wherein the first lens element includes a concave image-side surface.

118. The image capturing lens assembly of claim 112, wherein the first lens element includes a convex image-side surface.

119. The image capturing lens assembly of claim 112, wherein the second lens element includes a convex object-side surface.

120. The image capturing lens assembly of claim 112, wherein the second lens element includes a concave object-side surface.

121. The image capturing lens assembly of claim 112, wherein the second lens element includes a convex image-side surface.

122. The image capturing lens assembly of claim 112, wherein the second lens element includes a concave image-side surface.

123. The image capturing lens assembly of claim 112, wherein the third lens element includes a concave object-side surface.

124. The image capturing lens assembly of claim 112, wherein the third lens element includes a concave image-side surface.

125. The image capturing lens assembly of claim 112, wherein the third lens element includes a convex image-side surface.

126. The image capturing lens assembly of claim 112, wherein the fourth lens element includes a convex object-side surface.

127. The image capturing lens assembly of claim 112, wherein the fourth lens element includes a concave object-side surface.

128. The image capturing lens assembly of claim 112, wherein the fourth lens element includes a convex image-side surface.

129. The image capturing lens assembly of claim 112, wherein the fourth lens element includes a concave image-side surface.

130. The image capturing lens assembly of claim 112, wherein the fifth lens element includes a concave object-side surface.

131. The image capturing lens assembly of claim 112, wherein the sixth lens element includes a concave object-side surface.

132. The image capturing lens assembly of claim 112, wherein the sixth lens element includes a convex object-side surface.

133. The image capturing lens assembly of claim 112, wherein the image capturing lens assembly includes at least four lens elements which include plastic materials.

134. The image capturing lens assembly of claim 112, further comprising:
a stop,
wherein the third lens element has a negative refractive power
wherein an axial distance SD between the stop and the image-side surface of the sixth lens element and an axial distance TD between the object-side surface of the first lens element and the image-side surface of the sixth lens element satisfy:

$0.7 < SD/TD < 1.2$.

135. The image capturing lens assembly of claim 112, wherein a distance Yc between an off-axis point with a tangent line perpendicular to the optical axis on the image-side surface of the sixth lens and the optical axis, and the focal length f of the image capturing lens assembly satisfy:

$0.1 < Yc/f < 0.6$.

136. The image capturing lens assembly of claim 112, wherein a refractive index N2 of the second lens element, a refractive index N3 of the third lens element, an Abbe number V1 of the first lens element, and an Abbe number V2 of the second lens element satisfy:

$-2.0 < (N2-N3) \times 10 < -0.5$;
and $|V1-V2| < 15$.

137. The image capturing lens assembly of claim 112, wherein a central thickness CT5 of the fifth lens element and a central thickness CT6 of the sixth lens element satisfy:

$0.3 < CT5/CT6 < 1.0$.

138. The image capturing lens assembly of claim 112, wherein a central thickness CT5 of the fifth lens element and a central thickness CT6 of the sixth lens element satisfy:

$0.58 \leq CT5/CT6 < 1.0$.

139. The image capturing lens assembly of claim 112, further comprising:
an image sensor located to capture an image formed at an image plane by the image capturing lens assembly,
wherein a maximum image height ImgH of the image at the image plane and an axial distance TTL between the object-side surface of the first lens element and the image plane satisfy:

$TTL/ImgH < 2.2$.

140. The image capturing lens assembly of claim 112, further comprising:
an image sensor located to capture an image formed at an image plane by the image capturing lens assembly,
wherein a maximum image height ImgH of the image at the image plane and an axial distance TTL between the object-side surface of the first lens element and the image plane satisfy:

$TTL/ImgH \leq 1.81$.

141. A portable electronic product comprising:
an image sensor; and
an image capturing lens assembly located relative to the image sensor to form an image on the image sensor, the image capturing lens assembly including, in order from an object side to an image side:
a first lens element with a positive refractive power having a convex object-side surface;
a second lens element with a positive refractive power;
a third lens element with a refractive power;
a fourth lens element with a refractive power;
a fifth lens element with a refractive power and including a convex image-side surface; and
a sixth lens element with a refractive power and including a concave image-side surface, wherein an object-side surface and the image-side surface of the sixth lens element are aspheric, and the sixth lens element has at least one inflection point formed on the image-side surface thereof; wherein a focal length f of the image capturing lens assembly and a focal length f3 of the third lens element satisfy:

$|f/f3| > 0.5$.

142. The image capturing lens assembly of claim 141, wherein the image capturing lens assembly has at least four lens elements which include plastic materials.

143. The image capturing lens assembly of claim 141, wherein the image sensor is located at an image plane of the image capturing lens assembly, and
wherein a maximum image height ImgH of an image at the image plane, and the focal length f of the image capturing lens assembly satisfy:

$ImgH/f > 0.65$.

144. The image capturing lens assembly of claim 141, wherein the image sensor is located at an image plane, and
wherein a maximum image height ImgH of an image at the image plane, and the focal length f of the image capturing lens assembly satisfy:

$ImgH/f > 0.72$.

145. The image capturing lens assembly of claim 141, wherein a curvature radius R12 of the image-side surface of the sixth lens element and the focal length f of the image capturing lens assembly satisfy:

$0.2 < R12/f < 0.4$.

146. The image capturing lens assembly of claim 141, wherein a distance Yc between an off-axis point with a tangent line perpendicular to the optical axis on the image-side surface of the sixth lens and the optical axis, and the focal length f of the image capturing lens assembly satisfy:

$0.1 < Yc/f < 0.6$.

147. The image capturing lens assembly of claim 141, wherein the axial distance between the fifth lens and the sixth lens is smaller than the axial distance between any other two adjacent lens elements with refractive power.

148. The image capturing lens assembly of claim 141, wherein the axial distance between the fourth lens and the fifth lens is larger than the axial distance between any other two adjacent lens elements with refractive power.

149. A portable electronic product comprising:
an image sensor; and
an image capturing lens assembly located relative to the image sensor to form an image on the image sensor, the image capturing lens assembly including, in order from an object side to an image side:
a first lens element with a positive refractive power and including a convex object-side surface;
a second lens element with a positive refractive power;
a third lens element with a refractive power;
a fourth lens element with a refractive power;
a fifth lens element with a refractive power and including a convex image-side surface and a plastic material; and
a sixth lens element with a refractive power and including a concave image-side surface and a plastic material, wherein an object-side surface and the image-side surface of the sixth lens element are aspheric, and the sixth lens element has at least one inflection point formed on the image-side surface;
wherein a focal length f of the image capturing lens assembly, a focal length f1 of the first lens element, a focal length f2 of the second lens element, and an Abbe number V2 of the second lens element satisfy:

$0.3<(f/f1)+(f/f2)<3.5;$ and $V2>28.$

150. The image capturing lens assembly of claim 149, wherein the image sensor is located on an image plane of the image capturing lens assembly, and
wherein a maximum image height ImgH of an image on the image plane, and the focal length f of the image capturing lens assembly satisfy:

$ImgH/f>0.65.$

151. The image capturing lens assembly of claim 149, wherein the image sensor is located on an image plane of the image capturing lens assembly, and
wherein a maximum image height ImgH of the image capturing lens assembly and the focal length f of the image capturing lens assembly satisfy:

$ImgH/f>0.72.$

152. The image capturing lens assembly of claim 149, wherein a curvature radius R12 of the image-side surface of the sixth lens element and the focal length f of the image capturing lens assembly satisfy:

$0.2<R12/f<0.4.$

153. The image capturing lens assembly of claim 149, wherein a distance Yc between an off-axis point with a tangent line perpendicular to the optical axis on the image-side surface of the sixth lens and the optical axis and the focal length f of the image capturing lens assembly satisfy:

$0.1<Yc/f<0.6.$

154. The image capturing lens assembly of claim 149, wherein the axial distance between the fifth lens and the sixth lens is smaller than the axial distance between any other two adjacent lens elements with refractive power.

155. The image capturing lens assembly of claim 149, wherein the axial distance between the fourth lens and the fifth lens is larger than the axial distance between any other two adjacent lens elements with refractive power.

* * * * *